United States Patent
Tokioka et al.

(10) Patent No.: US 6,255,604 B1
(45) Date of Patent: *Jul. 3, 2001

(54) COORDINATE DETECTING DEVICE FOR OUTPUTTING COORDINATE DATA WHEN TWO POINTS ARE SIMULTANEOUSLY DEPRESSED, METHOD THEREFOR AND COMPUTER CONTROL DEVICE

(75) Inventors: Masaki Tokioka, Fujisawa; Atsushi Tanaka, Yamato; Yuichiro Yoshimura, Kamakura; Ryozo Yanagisawa, Chiba-ken; Katsuyuki Kobayashi; Hajime Sato, both of Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 08/654,745

(22) Filed: May 29, 1996

(30) Foreign Application Priority Data

May 31, 1995 (JP) .................................................. 7-156956
Jul. 20, 1995 (JP) .................................................. 7-184202

(51) Int. Cl.[7] .................................................. G08C 21/00

(52) U.S. Cl. .................................. 178/18.01; 178/18.03; 178/18.05; 178/18.06

(58) Field of Search .................................... 345/173, 174, 345/178, 179; 178/18.01, 18.03, 18.05, 18.06, 18.07, 19.01, 19.03, 19.04

(56) References Cited

U.S. PATENT DOCUMENTS

| 4,707,845 | * | 11/1987 | Krein et al. | 345/173 |
| 4,832,144 | * | 5/1989 | Murakami et al. | 178/18 |
| 4,853,498 | * | 8/1989 | Meadows | 345/174 |
| 5,402,151 | * | 3/1995 | Duwaer | 345/173 |
| 5,466,896 | * | 11/1995 | Murakami et al. | 178/19 |
| 5,484,967 |   | 1/1996 | Yanagisawa et al. | 178/19 |
| 5,579,036 | * | 11/1996 | Yates | 178/18 |
| 5,589,856 | * | 12/1996 | Stein | 345/173 |

FOREIGN PATENT DOCUMENTS

| 0309946 | 4/1989 | (EP) . |
| 0435438 | 7/1991 | (EP) . |
| 02133851 | 5/1990 | (JP) . |
| 02270016 | 11/1990 | (JP) . |

* cited by examiner

*Primary Examiner*—Vijay Shankar
(74) *Attorney, Agent, or Firm*—Fitzpatrick, Cella, Harper & Scinto

(57) ABSTRACT

In the coordinate detection of resistive film system, detection of the coordinates of simultaneously designated two points is made possible. On a touch panel composed of two conductive films, whether input is made in a point or simultaneously at two points is judged by a current monitor. Simultaneous inputs at two points decrease the apparent resistance of the conductive film, and can be detected by an increase in the current. If the input of a point is identified, the coordinate data of the input point are retained as latest coordinate data in a RAM. If simultaneous inputs at two points are identified, coordinate data are obtained from the coordinate data retained in the RAM and from the potentials in the x and y directions, obtained from two conductive films constituting a touch panel, through amplifiers, and are outputted, together with the coordinate data retained in the RAM, as the coordinate data of the two points.

12 Claims, 17 Drawing Sheets

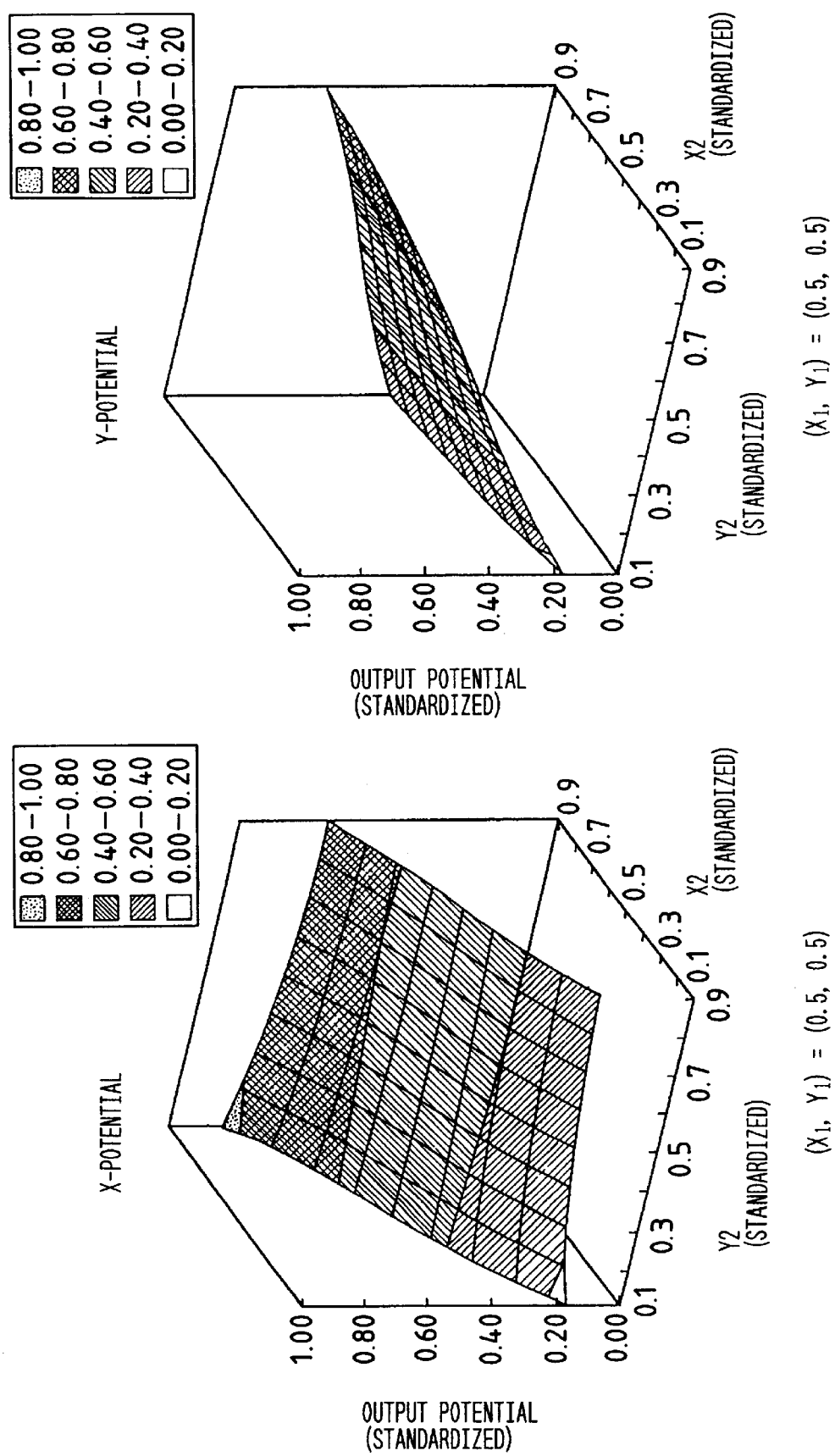

COORDINATE DETECTING DEVICE FOR OUTPUTTING COORDINATE DATA WHEN TWO POINTS ARE SIMULTANEOUSLY DEPRESSED, METHOD THEREFOR AND COMPUTER CONTROL DEVICE

BACKGROUND OF THE INVENTION

1. Field of the Invention

The present invention relates to a coordinate detecting device for detecting the coordinate position, designated with a pen or a finger, and a method therefor.

2. Related Background Art

For entering the coordinate there are already known devices of various types, such as (1) resistive film (pressure sensing) system, (2) electrostatic capacitance coupling, electromagnetic induction and electromagnetic exchange systems, (3) ultrasonic system, (4) stilus pen system and (5) photointerruptor touch panel system.

The coordinate input device of the system (1) is constructed with two superposed sheets of glass or resinous film provided thereon with a resistive film (hereinafter collectively called "conductive film"), wherein two resistive films come into mutual contact to transmit a current at a designated position. The potential at the contacting position is detected to determine the resistance from a reference plane to the contacting point, whereby the position of contact is identified and converted into the positional coordinate.

The coordinate input device of the system (2) is composed of one, two or more glass plates or resinous sheets bearing linear or loop coil-shaped transparent electrode patterns aligned in the x and y directions of the input face, wherein a signal detected by an exclusive pen through an electromagnetic wave is processed to specify the transparent electrode pattern closest to the position designated by the pen. Thus the designated position is determined and converted into the coordinate value.

The device of the system (3) is provided with plural vibration detecting means (sensors) on a tablet constituting the input plane, to detect the vibration entered by vibration input means, wherein the distances from the vibration input means to the sensors are detected from the propagation speed of the vibration and the time required for propagation, and the coordinate of the input position is determined.

The device of the system (4) is to detect the CRT scanning signal with a stilus pen contacting the CRT, wherein the position on the raster pattern is specified from the detected timing of scanning and the coordinate value is determined.

In the device of the system (5), light beams such as of infrared light are provided as a network on the display face. When one of the beams is intercepted with a finger, a touch input is detected, and the coordinate of the input position is identified from the sensor detecting the interception of the light beam.

Also an information processing equipment in which the coordinate input device as explained above and a display device such as a liquid crystal display are integrally superposed allows to enter a gesture as a command with a pen-shaped tool on the display plane, to enter characters as a memorandum on the display, and to enter characters by character recognition.

Also in such information processing equipment, it is proposed to display a keyboard as a "virtual keyboard". In such case the coordinate input device utilizes the aforementioned system (1) based on the resistive films, since the input operations with fingers are required for use in place for the actual keyboard.

However such conventional coordinate input device, particularly that of the system (2), (3) or (4), requiring an exclusive pen for coordinate input, has been associated with a drawback that the input operation is not possible without such exclusive pen.

Also the device of the system (1), (3) or (4), only allows the coordinate input of a point at a time, do not allow entry of plural coordinates over a wide range at a time.

Also the information processing equipment utilizing the coordinate input device as explained above has been associated with the following drawbacks.

At first, a pen-shaped coordinate indicator is preferable for entering a gesture as a command, characters as a memorandum or a character for character recognition, but a conventional keyboard is faster and more convenient for entering text data (a large amount of character data). However, if the above-mentioned "virtual keyboard" is used instead of the ordinary keyboard, the entry of plural points is not possible on such "virtual keyboard" because the system (1) based on the resistive film has to be used.

As the input of plural points is not possible on the "virtual keyboard", it is not possible, unlike the ordinary keyboard, to use a key while [shift] key or [ctrl] key is depressed, but the input operation has to be made one at a time, such as depressing the [shift] key etc. at first and then depressing another key. Consequently the method of manipulation has to be modified from the ordinary operation. Besides the input operation is not possible in certain cases, such as the shortcut keys, so that such "virtual keyboard" cannot be a complete replacement for the conventional keyboard and cannot be used for high-speed input of a large amount of data.

In consideration of the foregoing, the object of the present invention is to provide a coordinate input device capable of simultaneous input of plural points.

SUMMARY OF THE INVENTION

The above-mentioned object can be attained, according to the present invention, in the following manner.

According to one aspect of the present invention, there is provided a coordinate input device provided with two resistive films receiving voltages at respective ends thereof and adapted to determine the coordinate of a position entered by pressure on said resistive films from the output potential of the resistive films in response to the input state, comprising a selection area set in a part of the resistive films for selecting the input state; discrimination means for discriminating a one-point input state in which a point is entered by pressure outside the selection area on the resistive films and a two-point simultaneous input state in which, while a first point is entered in the selection area, a second point is entered in succession on the resistive films; storage means for storing the coordinate of the first point; memory means storing a calculation formula for deriving the coordinate of the second point, based on the coordinate positions of the first and second points at the entry of the second point, the output potential of the resistive films at the entry of the second point and the coordinate stored in the storage means; and control means for determining the coordinate of the second point from the output potential of the resistive films based on the calculation formula, when the two-point simultaneous input state is identified by the discrimination means.

According to another aspect of the invention, there is provided a coordinate input device wherein the control means is adapted, in case the two-point simultaneous input state is identified by the discrimination means, to effect an inversion control on the direction of the voltages applied to the resistive films according to the coordinate stored in the storage means, and then to determine the coordinate of the second point from the output potential of the resistive films based on the calculation formula.

According to an embodiment of the present invention, there is provided a coordinate detecting device provided with a panel composed of two conductive films, comprising:

discrimination means for discriminating whether two points are simultaneously depressed on the panel;

retaining means adapted, in case the discrimination means identifies the depression of a point on the panel, to the coordinate of the depressed position as latest coordinate data;

obtaining means adapted, in case the discrimination means identifies the simultaneous depression of two points on the panel, to obtain coordinate data based on the coordinate data retained in the retaining means and potentials in the x and y directions obtained from the conductive films; and output means for releasing the coordinate data retained in the retaining means and the coordinate data obtained by the obtaining means as the coordinate data of the simultaneously depressed two points.

In the above-mentioned configuration, the latest coordinate data, in case a point is entered on the panel composed of two conductive films, is retained by the retaining means. If the simultaneous depressions of two points are discriminated on the panel, the coordinate data are obtained, based on the coordinate data retained in the retaining means and the potentials in the x and y directions respectively obtained from the two conductive films. The coordinate data thus obtained and the coordinate data retained in the retaining means are released as the coordinate data of the simultaneously entered two points.

BRIEF DESCRIPTION OF THE DRAWINGS

FIGS. 8A and 8B are charts showing the potential output of actual films;

DESCRIPTION OF THE PREFERRED EMBODIMENTS

Now the present invention will be clarified in detail by preferred embodiments thereof, with reference to the attached drawings.

Embodiment 1

Figure 1:
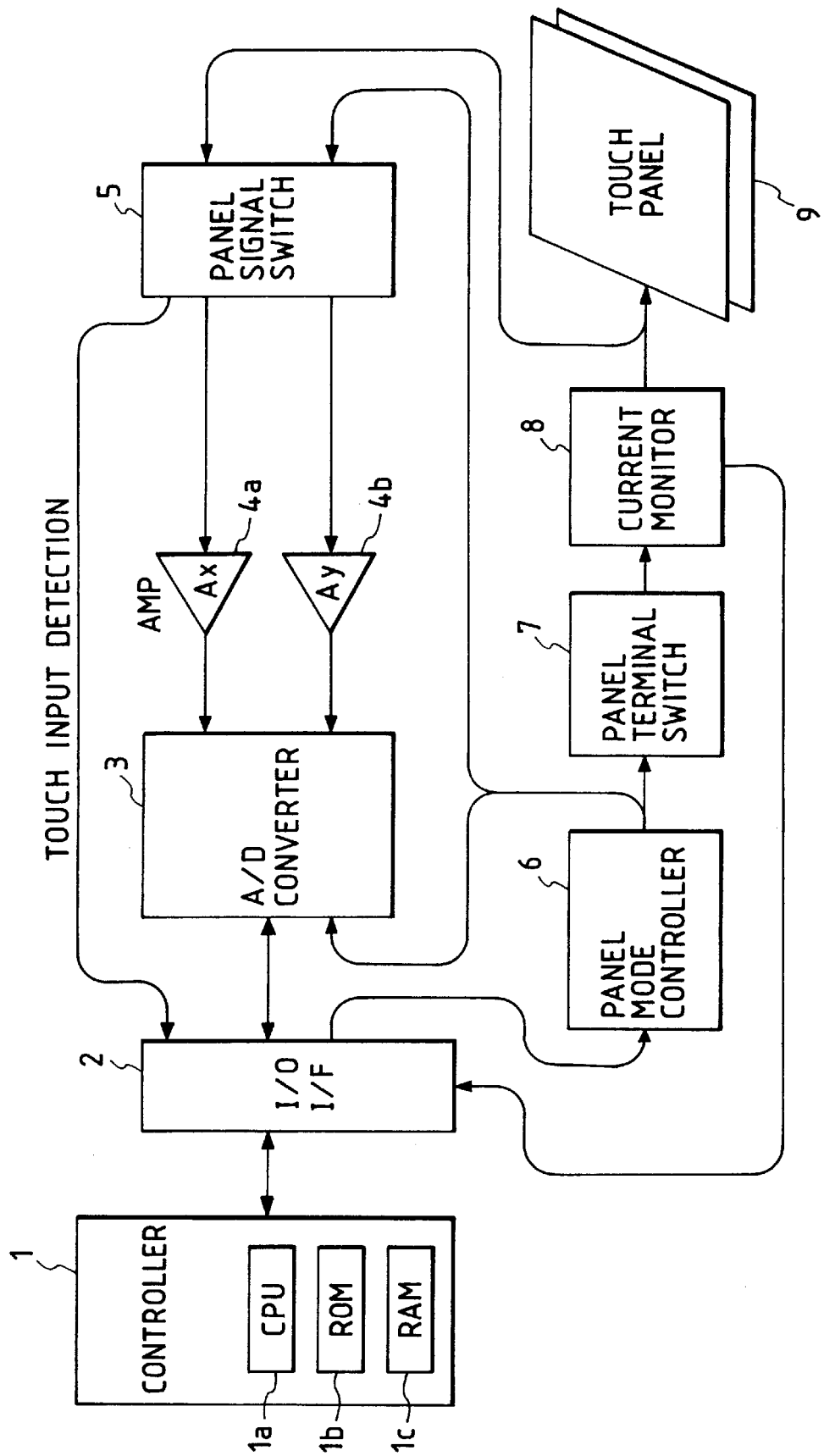
FIG. 1 is a block diagram showing the configuration of a coordinate detecting device embodying the present invention.

FIG. 1 is a block diagram showing the structure of a coordinate input device embodying the present invention. A touch panel 9 is composed of conductive films, with their conductive sides mutually facing, which are so positioned as to come into mutual contact only in a position depressed with a finger or a pen. The output potential of the touch panel 9, varying with the change in such contact position, is detected and used for determining the coordinate of the depressed position.

A control circuit 1 controls the switching of various modes (one-point input mode, two-point input mode, touch input discrimination mode etc.) to be explained later, and effects coordinate calculation, based on the potential data obtained from the touch panel 9. An I/O interface 2 transmits various instructions from the control circuit 1 to the touch panel 9 and signals therefrom to the control circuit 1.

An A/D converter 3 converts the potential signal, released from the touch panel 9, into a digital value usable in the control circuit 1. Amplifiers 4a, 4b amplify the potential signals obtained from the touch panel 9, and are respectively used for the x and y coordinates. A panel output switch 5 sends the signals for x and y coordinates, from the touch panel, respectively to the amplifiers 4a and 4b.

A panel mode controller 6 controls a panel terminal switch 7, the A/D converter 3 and the panel signal switch 5 according to the mode instruction (one-point input mode, two-point input mode, touch input discrimination mode etc.) from the control circuit 1. The panel terminal switch 7 switches the connection between the touch panel 9 and the power supply and that between the touch panel 9 and a signal output portion, according to the various modes. A current monitor 8 monitors the current in the touch panel 9.

In the above-explained configuration, the method and structure for detecting the input position, in case of the input of a point are same as those in the conventional resistive film system. The coordinate input device of the present embodiment is featured, in case two points are simultaneously designated, by detecting such inputs of two points and being capable of detecting the coordinates of such two points.

In comparison with the conventional device, the coordinate input device of the present embodiment is at first featured, in the constituent component, by the current monitor 8. In the following description, the function of the conventional resistive film system will be omitted in the already known part, and emphasis will be given to the function of the current monitor 8 and the related circuitry.

At first, for discriminating the presence or absence of a touch to the touch panel 9, the control circuit 1 sets a touch input discrimination mode in the panel mode controller 6 through the I/O interface 2. In this touch input discrimination mode, the panel mode controller 6 shifts the panel terminal switch 7 in such a manner that a current flows between the two films of the touch panel 9 in case of a finger contact. As a result, in response to a touch input, a high-level signal is supplied to the panel signal switch 5, and a touch input detection signal is supplied to the control circuit 1 through the I/O interface 2.

Upon detecting the touch input, the control circuit 1 sets the panel terminal switch 7, through the above-mentioned path via the panel mode controller 6, so as to give a current in succession to the two films constituting the touch panel 9, in order to discriminate whether the above-mentioned touch input is a two-point input, and the current monitor 8 monitors the current flowing on the film. The current monitor 8 can be so constructed as to connect a low resistance serially to the two films of the touch panel 9 and to compare the voltage across the resistance, under the current, with a predetermined threshold value, and is only required to detect a current exceeding a predetermined value. As explained later, the current on the film increases in case of a two-point input. The output of the current monitor 8 is supplied, through the I/O interface 2, to the control circuit 1, which in response determines a one-point input mode or a two-point input mode, thereby switching the mode of the coordinate calculation process.

A subsequent operation for obtaining the data, required by the control circuit 1 for calculating the coordinate, from the touch panel 9, more specifically an operation of detecting the output potentials of the touch panel, amplifying these potentials by the amplifiers 4a, 4b, converting these potentials into digital data and sending them to the control circuit 1, is same as in the ordinary coordinate input device. The data obtained by the control circuit 1 are used in the calculation of the coordinate, according to different calculation formulas respectively in the one-point input mode and the two-point input mode, as will be explained later with reference to flow charts.

For realizing the control mentioned above, the control circuit 1 is provided with a CPU 1a, a ROM 1b and a RAM 1c. The CPU 1a effects various controls by executing control programs stored in the ROM 1b. Control programs shown by flow charts to be explained later are also stored in the ROM 1b. The RAM 1c provides a work area in the execution of various controls by the CPU 1a. The control programs represented by the following flow charts may also be loaded into the RAM 1c from a memory medium such a floppy disk or a hard disk and executed by the CPU 1a. Furthermore, the control circuit 1 may be incorporated in the coordinate input device as in the present embodiment, or in an information processing apparatus, such as a host computer, to which the coordinate input device is connected. In the latter case, the coordinate detection of the present embodiment may be realized by supplying the information processing apparatus with the control programs, for realizing the control of the following flow charts, from a memory medium such as a floppy disk or a hard disk.

Figure 2:
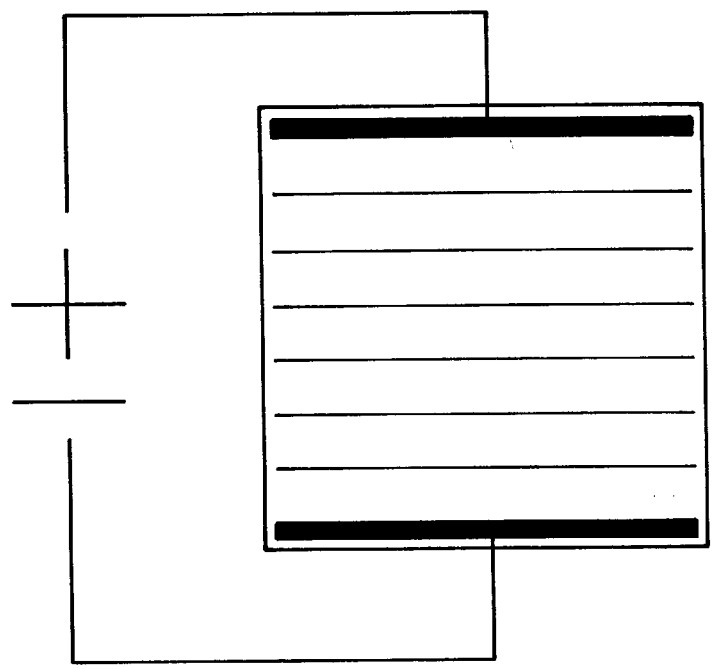
FIG. 2 is a view showing the potential distribution on a conductive film.

FIG. 2 shows the potential distribution on a conductive film, wherein iso-potential lines are aligned with equal distances on the film, as shown in FIG. 2. When a point is depressed for example with a finger, the output potential varies according to the position in the vertical direction in FIG. 2. Thus, a same output potential is obtained for a same horizontal position.

In the following there will be explained the operation of obtaining the coordinate in the one-point input mode and in the two-point input mode.

Figure 3:
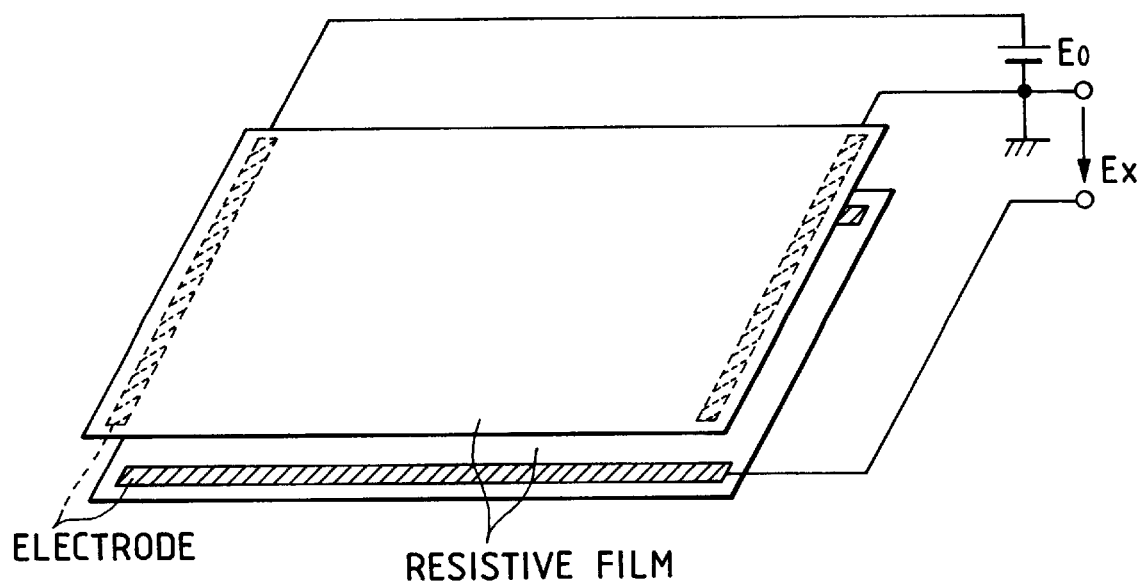
FIG. 3 is a view showing the configuration of a touch panel of the above-mentioned embodiment.
Figure 4:
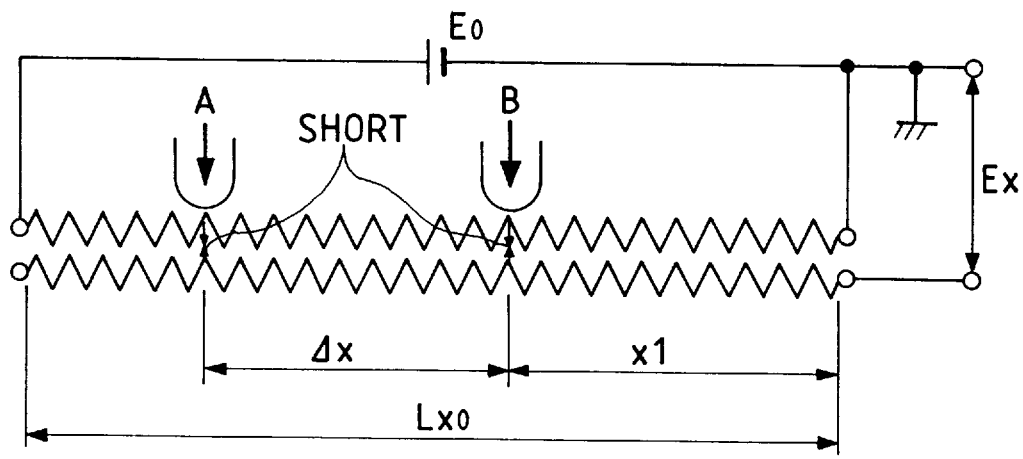
FIG. 4 is an equivalent circuit diagram showing a state of depression of an arbitrary position on the touch panel.

FIG. 3 is a schematic view of the configuration of the touch panel in the present embodiment, and FIG. 4 is an equivalent circuit diagram when an arbitrary position is depressed on the touch panel.

Each of the two conductive films constituting the touch panel 9 has a uniform distribution of the resistance, and FIG. 3 shows a state of applying a voltage in the transversal direction of the panel and obtaining the output from the opposed film (lower film) for voltage application in the vertical direction. In case only one point B is depressed, the output voltage Ex is represented by:

$$x1 = (Ex/E_0) \times Lx_0 \tag{1}$$

wherein $Lx_0$ is the lateral length of the panel, $E_0$ is the applied voltage, and $x1$ is the distance between the depressed position and the reference plane (shortest distance to the ground electrode). In case one-point input, the lateral position or x-coordinate can be directly detected from the equation (1). The y-coordinate can be detected similarly, by switching the voltage application to the panel through the panel terminal switch 7, so as to apply a voltage to the lower film and obtaining the output potential from the upper film. The coordinate values can thus be obtained by effecting the voltage application to the films in succession and detecting the output potential in succession from the other film. The voltage applied to the panel may be an AC or a DC voltage, and the detection may also be made with the current division ratio, instead of the potential.

In case of two-point inputs, with simultaneous depressions at points A and B as shown in FIG. 4, the current therebetween flows in two paths along the upper and lower films. If the contact resistance between the two films at the contact points becomes negligibly small by the sufficient depressing pressure, the resistance between the points A and B becomes about half, in comparison with the resistance in the undepressed state. Consequently the current on the films increases by the depression of the second point. For example, if the points A and B are respectively positioned at the left- and right-hand ends in FIG. 4, the current is approximately doubled. Thus the inputs at two separate points can be identified from the increase in current, by monitoring the current in the film. Stated differently, the simultaneous inputs at two points can be detected by detecting an increase in the current, resulting from two-point contacts, in the x or y film.

Figure 5A:
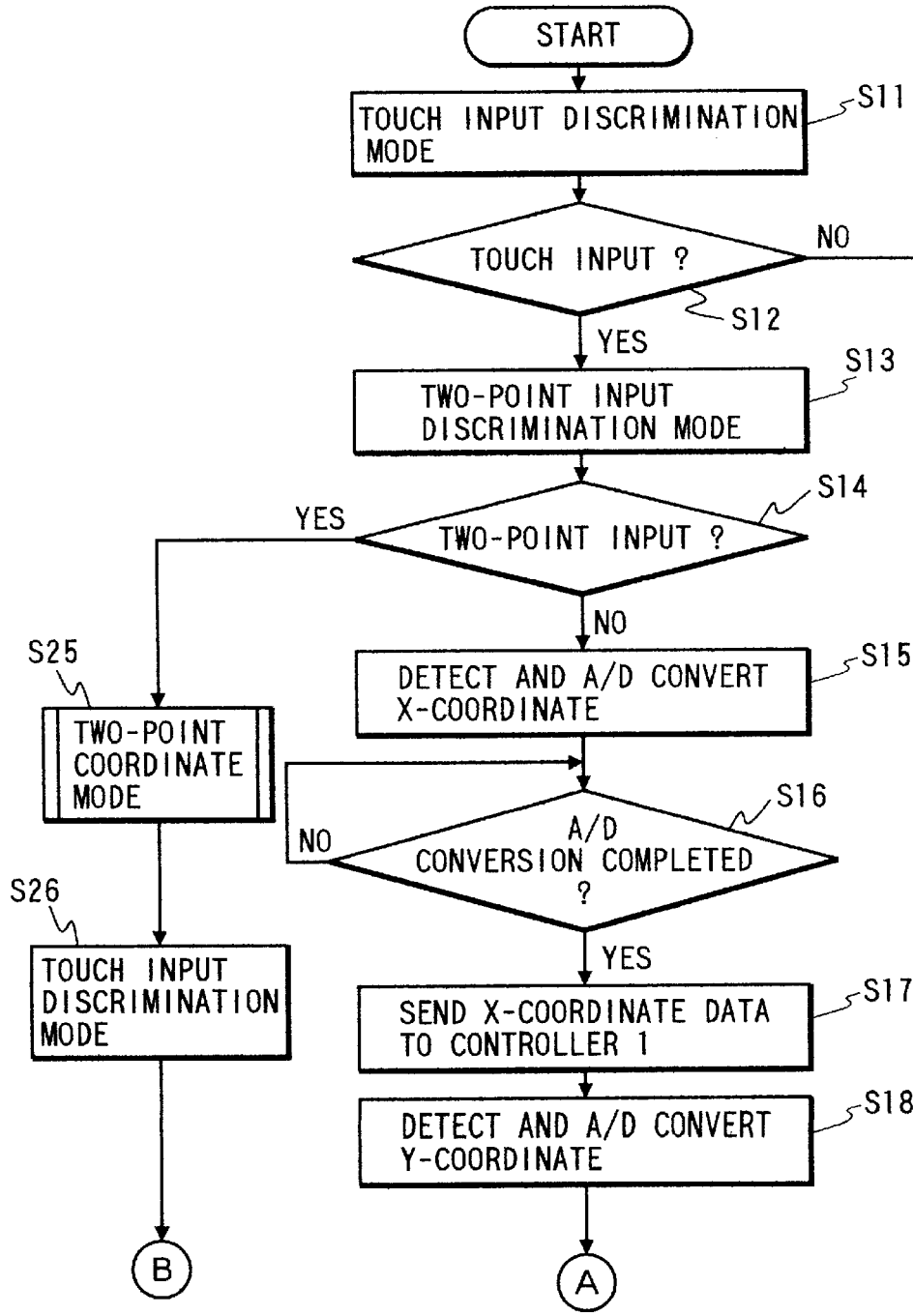
FIG. 5 which is comprised of FIGS. 5A and 5B, is a flow chart showing the sequence of a coordinate detecting process in the above-mentioned embodiment.
Figure 5B:
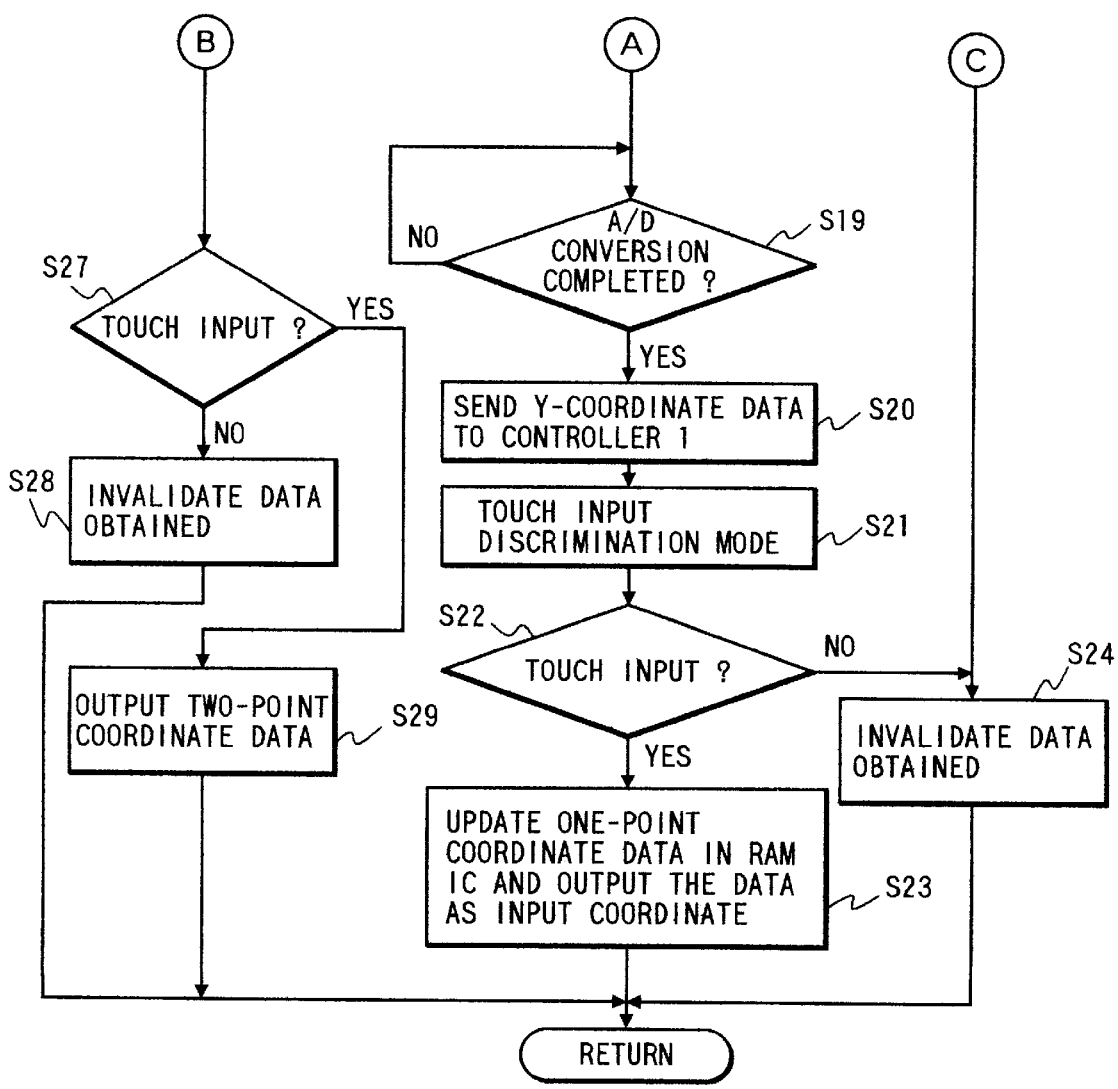
Figure 6:
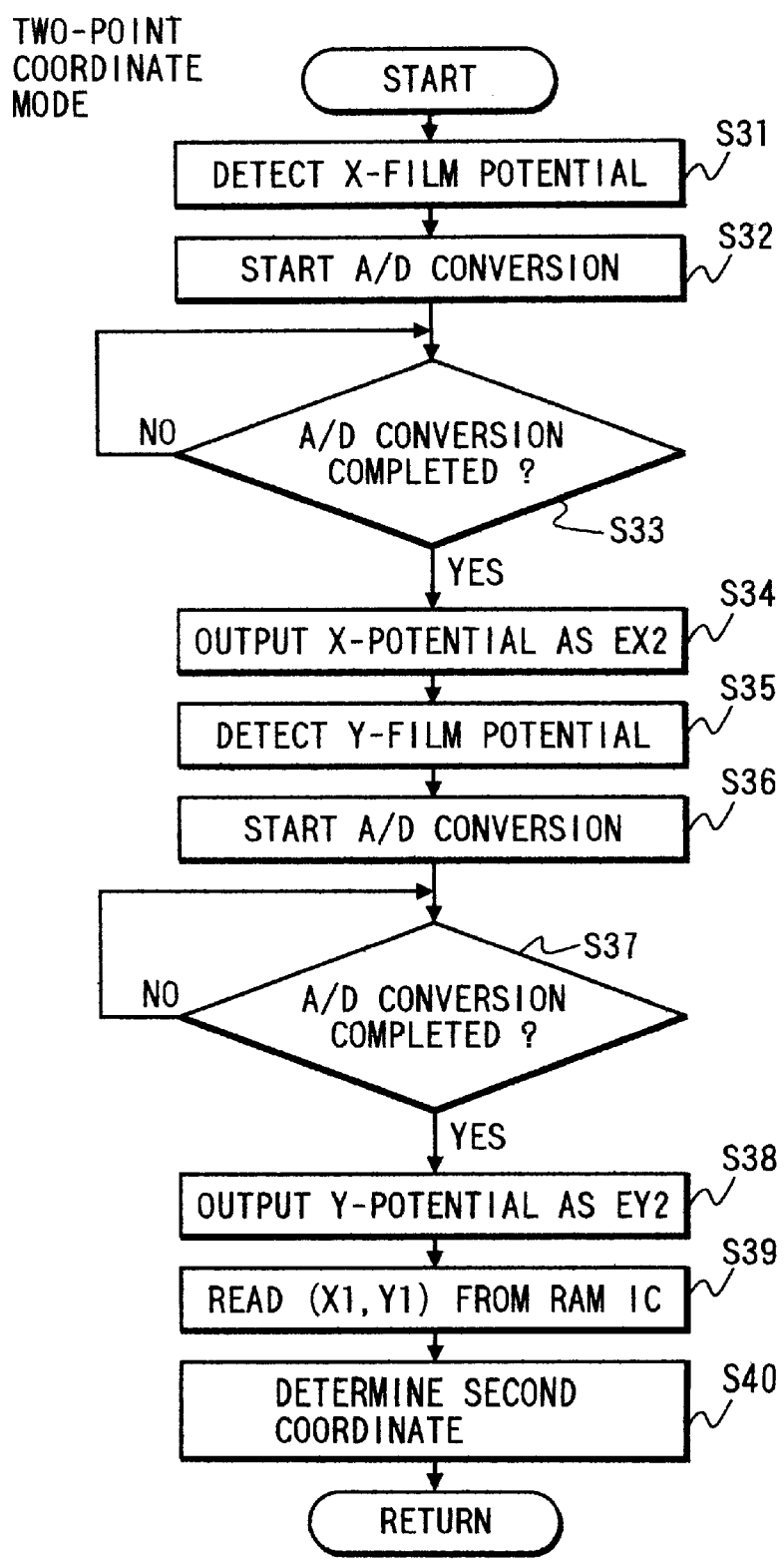
FIG. 6 is a flow chart showing the sequence of a coordinate obtaining process in a two-point input mode.

In the following there will be explained, with reference flow charts in FIGS. 5A to 6, the sequence of coordinate calculation by the control circuit 1. The flow charts in FIGS. 5A and 5B show the sequence of coordinate detection in the present embodiment, while that in FIG. 6 shows the sequence of coordinate obtaining in the two-point input mode.

At first, in the touch input discrimination mode, the panel terminal switch 7 is so switched as to discriminate the presence or absence of a tough input (steps S11, S12). If the touch input is identified as present, there is discriminated whether inputs at two points have been made (step S13). In this operation, the resistances of the two films of the touch panel are respectively detected by the output of the current monitor 8, and the inputs (contacts) at two points are identified if the resistance is lowered.

If the discrimination in the step S13 identifies an input at a point, the sequence proceeds from a step S14 to a step S15 for detecting the x coordinate. The output potential in the x direction is obtained by switching the panel terminal switch 7, then amplified by the amplifier 4a through the panel signal switch 5 and is subjected to A/D conversion by the A/D converter 3. After the A/D conversion, the sequence proceeds from a step S16 to a step S17 wherein the control circuit 1 receives the output potential for the x coordinate in the form of digital data. The control circuit 1 calculates the x coordinate, based on thus received data. The y coordinate is processed in a similar manner as the x coordinate (steps S18–S20).

Then a step S21 again discriminates the presence or absence of the touch input, in order to judge whether the touch input has been terminated in the course of execution of the coordinate detection explained above. If the touch input is no longer present (i.e., if the touch input has been terminated in the course of execution), the obtained coordinate data are considered unreliable and discarded (step S24). On the other hand, if the touch input still continues, the sequence proceeds to a step S23 to renew the coordinate data of a point in the RAM 1c and to release thus renewed coordinate data. In this manner a cycle of coordinate sampling flow is completed. The coordinate data of a latest point are always stored in the RAM 1c and are utilized in the two-point input mode to be explained later.

On the other hand, if the step S14 identifies inputs at two points in the two-point input discrimination mode, the sequence proceeds to a step S25 for executing a two-point coordinates calculation process which will be explained with reference to the flow chart in FIG. 6.

The coordinate calculation in the two-point input mode is same as that in the one-point input mode in the fetching of the output potential of each film after A/D conversion, but is different therefrom in the following points. The output potential of the x-axis film (in which the electrodes are positioned parallel to the y axis) or the y-axis film (in which the electrodes are positioned parallel to the x axis) is not proportional to the coordinate value. Also after the data fetching mentioned above, the coordinate data of the immediately previously sampled point are loaded from the RAM 1c and used as the data of the other of the two input points. The coordinate calculation is made by determining the coordinate data (x and y coordinates) of the other point from the output potentials of the two films. The present embodiment is featured by utilizing these factors.

The RAM 1c, storing the coordinate data of a point, is incorporated in the control circuit 1 as explained above. Also as will be apparent from the flow charts in FIGS. 5A and 5B, the coordinate data of a point are not renewed in the two-point input mode but only in the one-point input mode. Also in the flow chart shown in FIGS. 5A and 5B, the sampling is executed after the discrimination of the two-point input mode, but it is naturally possible to simultaneously effect the sampling (A/D conversion) of the output potential and the discrimination of the two-point inputs.

In the two-point input mode, the coordinate data of the immediately previously entered point are used because the coordinate input device of the present embodiment is anticipated to be used as a virtual keyboard. In the use as such keyboard, the operations of depressing two points (two keys) cannot take place strictly simultaneously. In such operation, it is customary to at first depress the "shift" key and to depress an alphabet key while the "shift" key is kept depressed, or to at first depress the "ctrl" key and then to depress another key while the "ctrl" key is kept depressed, and, also in consideration of the normal finger operation, it is natural to at first keep a key depressed and to depress another key Consequently, in the detection of inputs at two points, an input point remains fixed and the other input point is detected as unknown input data. Stated differently, the present embodiment utilizes a fact that two points are not entered at the strictly same time.

Figure 7:
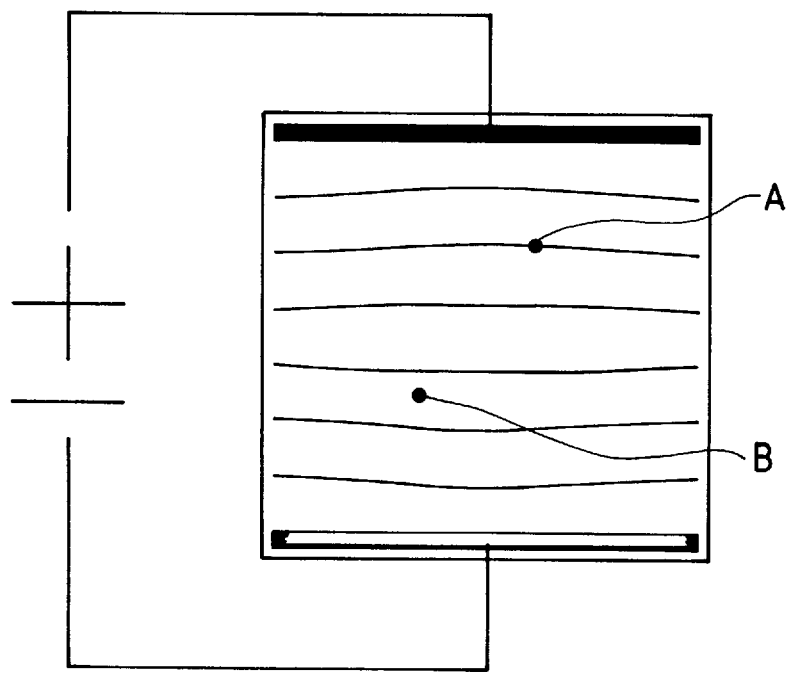
FIG. 7 is a view showing iso-potential lines on the film at the input of two points.

In the following there will be explained the output potential at the inputs of two points in the configuration shown in FIG. 3. FIG. 7 shows the iso-potential lines on the film surface at the two-point inputs. In such input state, as shown in FIG. 7, the iso-potential lines are no longer parallel straight lines. As the resistance between the points A and B is approximately halved, the potential Ea at the point A is given by:

$$Ea=(\Delta x/2+x1)/(Lx_0-\Delta x/2)\times E_0 \qquad (2)$$

Also the potential Eb at the point B is similarly given by:

$$Eb=x1/(Lx_0-\Delta x/2)\times E_0 \qquad (3)$$

Then there will be explained the method of calculating the coordinate of the second point from the output potentials. The output potential of the x-axis film is affected not only by the x-coordinates of the two points but also by the y-coordinates of the two points. Stated otherwise, the output potential is also affected by the position on the opposed film for output obtaining. For this reason, the potentials at the points A and B do not directly constitute the output potentials. In FIG. 4, the positions of the signal obtaining electrodes are same as the positions on the upper film because the illustration is simplified, but, in practice, the films are so positioned that the electrodes thereof are mutually perpendicular, as shown in FIG. 3. Thus, if the resistive layers of the two films have a substantially same resistance and if the pressure at the contact points is sufficiently high to sufficiently reduce the contact resistance, the output potential Ex2 is given by the following form, as in a resistance bridge:

$$Ex2=(yb\times Ea+ya\times Eb)/(ya+yb) \qquad (4)$$

wherein ya or yb is the distance between the point A or B and the signal obtaining electrode (shortest distance to the electrode).

Similarly the output obtained by applying a voltage to the other film is given by:

$$Ey2=(x2\times E1+x1\times E2)/(x1+x2) \qquad (5)$$

wherein $$\Delta x=x2-x1$$

$$E1=(\Delta y/2+y1)/(Ly_0-\Delta y/2)\times E_0$$

$$E2=y1/(Ly_0-\Delta y/2)\times E_0$$

$$\Delta y=y2-y1$$

FIGS. 8A and 8B show the output potentials on the actual films, wherein the known input point, or the latest input point in the one-point input mode, is represented by (x1, y1) while the newly depressed second point is represented by (x2, y2). FIGS. 8A and 8B show the output when the first point is approximately at the center of the touch panel, and the value (x2, y2) and the output potential (in the vertical axis) are represented by normalized values. As shown in these charts, the output is uniquely determined for a given (x2, y2) value. Stated differently, a set of output potentials only provides a coordinate.

Consequently the coordinate data (x2, y2) of the other point can be determined from the output potentials, by substituting the coordinate data, loaded from the memory of the coordinate data of the first point in the equations (4) and (5). Thus the coordinate input device sends, for example to the host computer, the coordinate data (x2, y2) determined by the calculation and the coordinate data (x1, y1) used in the calculation.

As explained in the foregoing, the calculation in the two-point input mode is executed by the x-potential (Ex2) and the y-potential (Ey2) at the depression of the second point and the coordinate value (x1, y1) entered at the immediately preceding one-point input.

The foregoing operation will be explained with reference to the flow chart in FIG. 6. When two-point inputs are identified, a step S31 detects the potential of the x-axis film. The detected potential is supplied through the panel signal switch 5 and the amplifier 3a to the A/D converter 3, and is released as the x-potential (Ex2) (steps S32–S34). Then a step S35 detects the potential of the y-axis film. The detected potential is supplied through the panel signal switch 5 and the amplifier 4b to the A/D converter 3, and is released as the y-potential (Ey2) (steps S36–S38).

A step S39 reads the coordinate data (x1, y1) of a point stored in the RAM 1c. Then a step S40 executes the calculation according to the equations (4) and (5), utilizing thus obtained x-potential Ex2, y-potential Ey2 and the coordinate data (x1, y1), thereby determining the coordinate of the second point.

Then the sequence proceeds to the step S26 in FIG. 5A. A process of evaluating the validity of the coordinate according to whether the touch input continues and disregarding the coordinate if the touch input no longer continues (steps S26–S28) is same as in the one-point input mode. If the coordinate data of the two points obtained in the foregoing sequence are effective, they are released in a step S29.

As explained in the foregoing, the present embodiment provides a coordinate input device enabling the inputs of two points, with the same touch panel 9 as in the prior art.

Embodiment 2

Figure 9A:
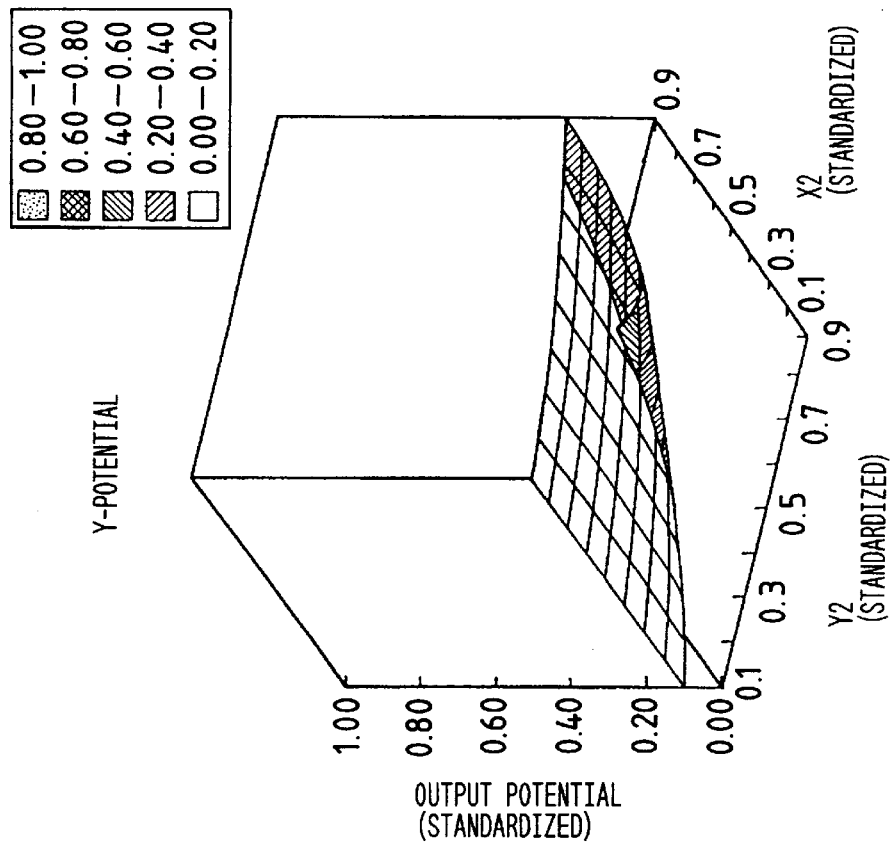
FIGS. 9A and 9B are charts showing the potential outputs of the x-axis and y-axis films in case the coordinate data (x1, y1) of a first point are (0.1, 0.1) (with coordinates in normalized values)
Figure 9B:
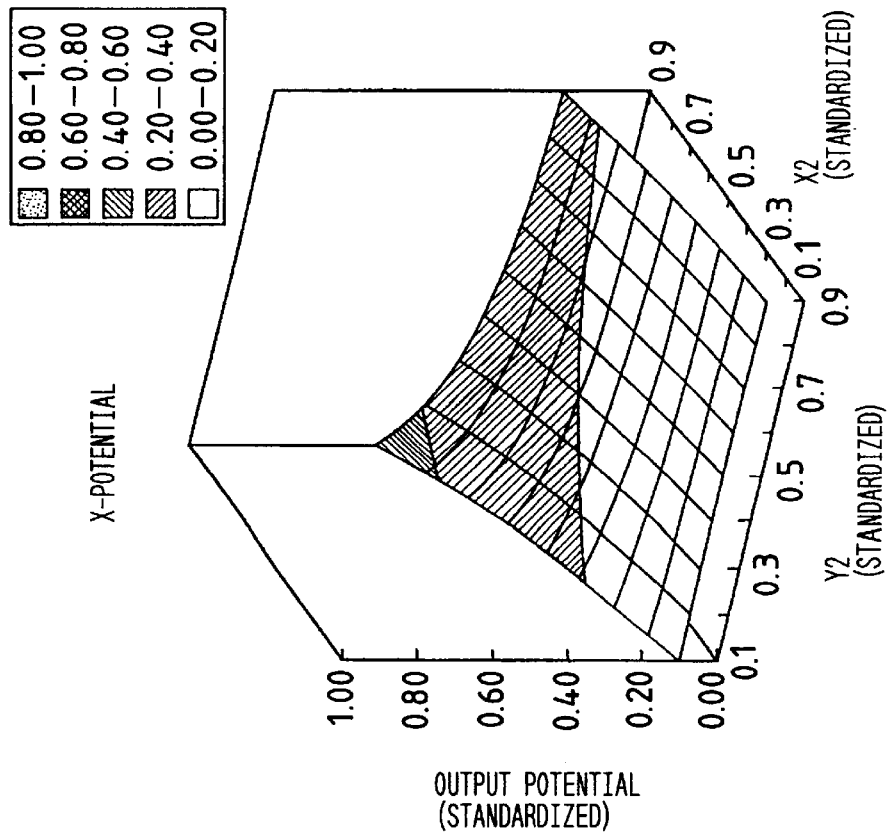

FIGS. 9A and 9B show the output potentials of the x- and y-axis films in case the coordinate data (x1, y1) of the first point are (0.1, 0.1) (in normalized values). These output potentials are not much different from the case where the coordinate data of the first point are (0.5, 0.5) shown in FIGS. 8A and 8B, and such limited change in the output potentials gives rise to a lowered resolving power in the calculation of the coordinate data (x2, y2). Such loss in the resolving power is not critical if the virtual keyboard extends over the entire area of the touch panel, but becomes a problem if the touch panel becomes larger and the virtual keyboard is formed in a part thereof.

Figure 10A:
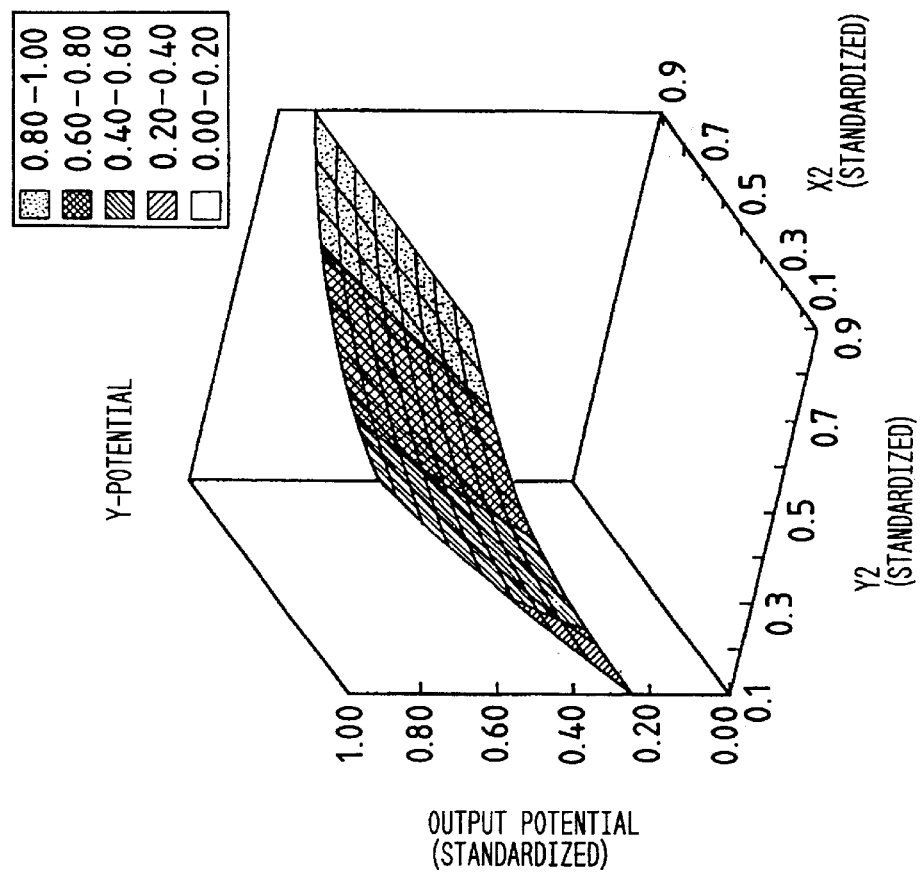
FIGS. 10A and 10B are charts showing the potential outputs of the x-axis and y-axis films in case the coordinate data (x1, y1) of a first point are (0.9, 0.9)
Figure 10B:
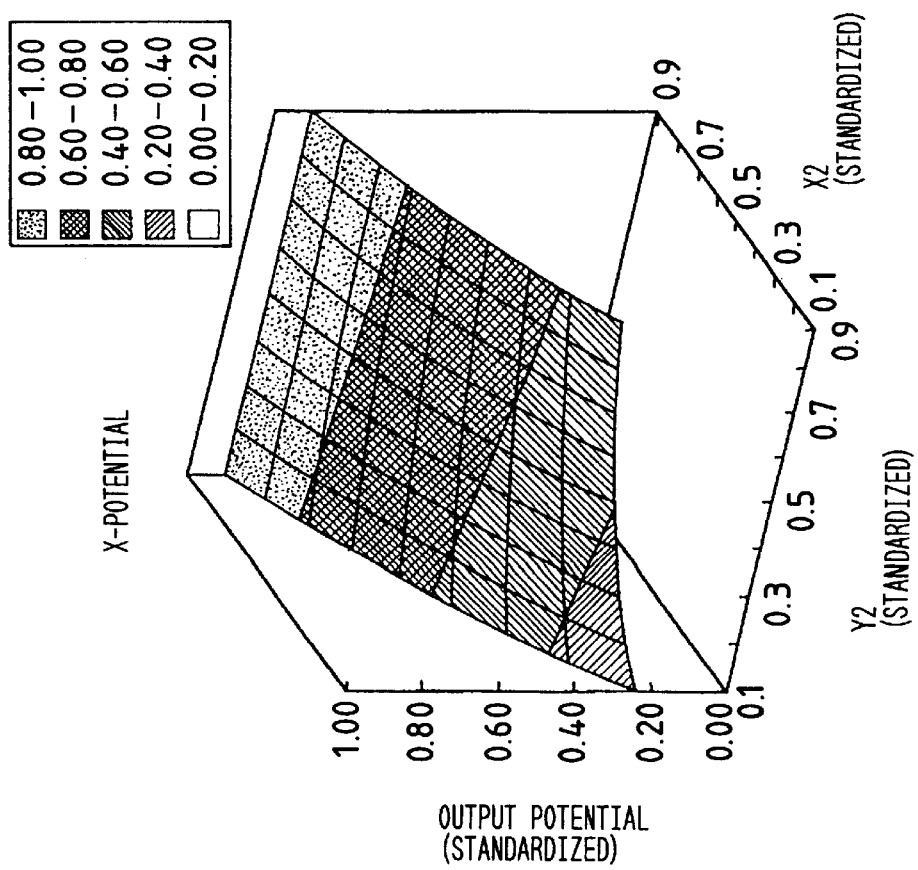

Also FIGS. 10A and 10B show the output potentials of the x- and y-axis films in case the coordinate data (x1, y1) of the first point are (0.9, 0.9). These charts indicate that a sufficient output range, or a high resolving power, can be obtained.

The difference between FIGS. 9A, 9B and 10A, 10B is the change of the coordinate data of the first point from (0.1, 0.1) to (0.9, 0.9). It is to be noted, however, that the coordinate value on the charts varies according to the direction of the applied voltage $E_0$. More specifically, by inverting the direction of $E_0$, x1=0.1 becomes x1=0.9. It will therefore be understood that two-point inputs with a high resolving power is made possible by inverting the direction of the applied voltage, according to the coordinate data of the first point.

Figure 11:
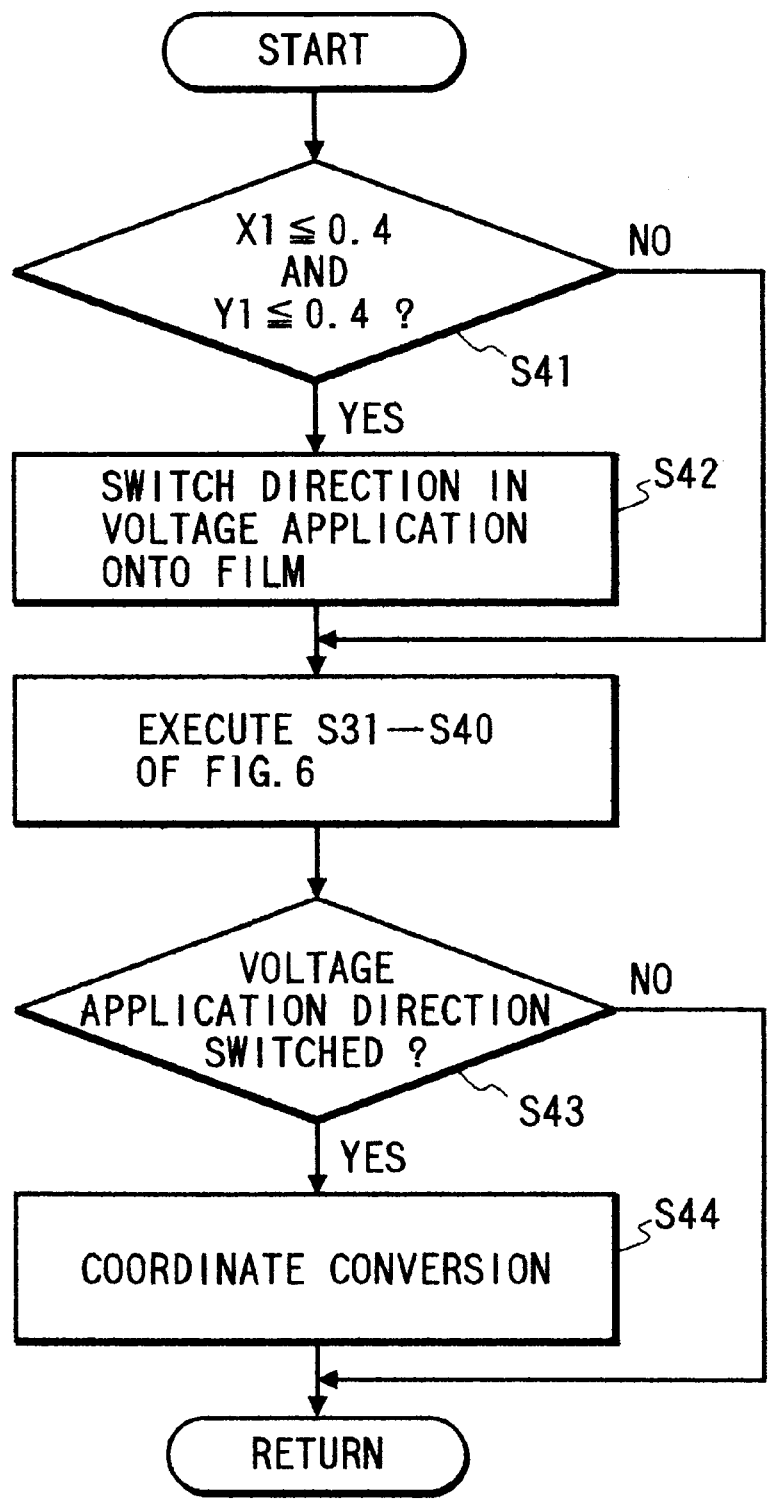
FIG. 11 is a flow chart showing the coordinate calculating process in a two-point input mode in a second embodiment.

As explained in the foregoing, it is possible, in the inputs of two points, to improve the resolving power by varying the direction of the applied voltage, based on the coordinate data of the first input point, and such variation in the applied direction can be realized by adding a connection form for switching the direction of the applied voltage to the panel terminal switch 7 and by executing a control sequence as shown in FIG. 11.

FIG. 11 is a flow chart showing the coordinate calculation sequence in the two-point input mode in the second embodiment. Immediately before the step S31, there is executed, as shown in FIG. 11, a process of switching the direction of the applied voltage according to the coordinate data of the first point. A step S41 discriminates whether each of the coordinate data (x1, y1), stored in the RAM 1c exceeds 0.4, and, if not, the sequence proceeds to a step S42 to invert the direction of application of the voltage to the film, by controlling the panel terminal switch 7. The panel terminal switch 7, realizing such control, can be easily formed with an electronic switch, such as of FET. In case the direction of the applied voltage is inverted, the original point of the coordinate obtained in the step S40 (FIG. 6) is varied. Therefore, a process of coordinate conversion is executed after the coordinate calculation (steps S43, S44).

As explained in the foregoing, the second embodiment provides a satisfactory resolving power in the two-point input mode, in any portion of the touch panel, by switching the direction of the applied voltage.

Embodiment 3

Figure 12:
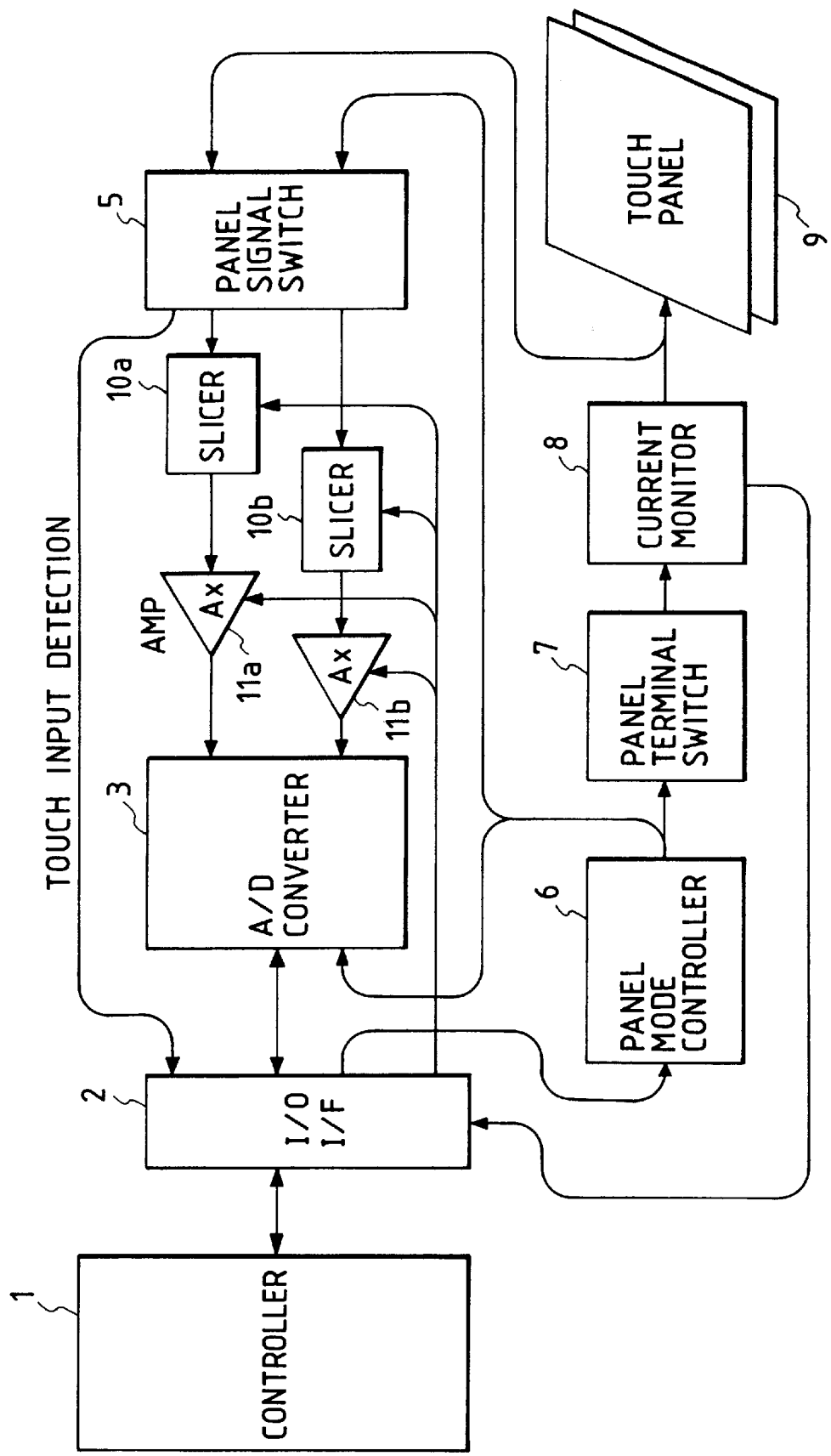
FIG. 12 is a block diagram showing the configuration of a coordinate detecting device in a third embodiment.

FIG. 12 is a block diagram of a coordinate input device in a third embodiment. The improvement in the resolving power of the output potential may be realized, instead of the switching of the direction of the applied voltage in the foregoing second embodiment, also by optimizing the detection range.

More specifically, an output as shown in FIGS. 9A and 9B can well be anticipated from the coordinate data of the first point stored in the memory. In such case, the resolving power of the detection can be maximized by matching such output range with the input range of the A/D converter 3. For this purpose, as shown in FIG. 12, there are provided slice circuits 10a, 10b for eliminating the DC component below the minimum output level, and variable-gain amplifiers 11a, 11b are given such maximum gains as not to saturate at the maximum output level, for processing the outputs of the touch panel 9. The resolving power may also be improved in this manner.

As explained in the foregoing, the third embodiment can realize the satisfactory resolving power over the entire input area in the two-point input mode, without switching of the direction of application of the voltage or conversion of the coordinate.

The foregoing embodiments provide a coordinate input device enabling simultaneous inputs of two points with the resistive film system and adapted for use as a virtual keyboard. Also the touch panel can realize the simultaneous inputs of two points with the simple conventional structure.

Also the coordinate entry with a sufficient resolving power is made possible, even when the virtual keyboard is reduced in size, by varying the direction of the applied voltage as explained in the second embodiment or by modifying the processing on the output signals of the touch panel as explained in the third embodiment.

The object of the present invention, attained by the function of the above-explained device or method, can also be attained by a memory medium storing the program of the foregoing embodiments. As an example, in case the control circuit 1 is realized by a host computer, such memory medium can be loaded in the host computer and the program itself read from the memory realizes the novel function. The structural feature of the program embodying the present invention is shown in FIGS. 13A and 13B.

Figure 13A:
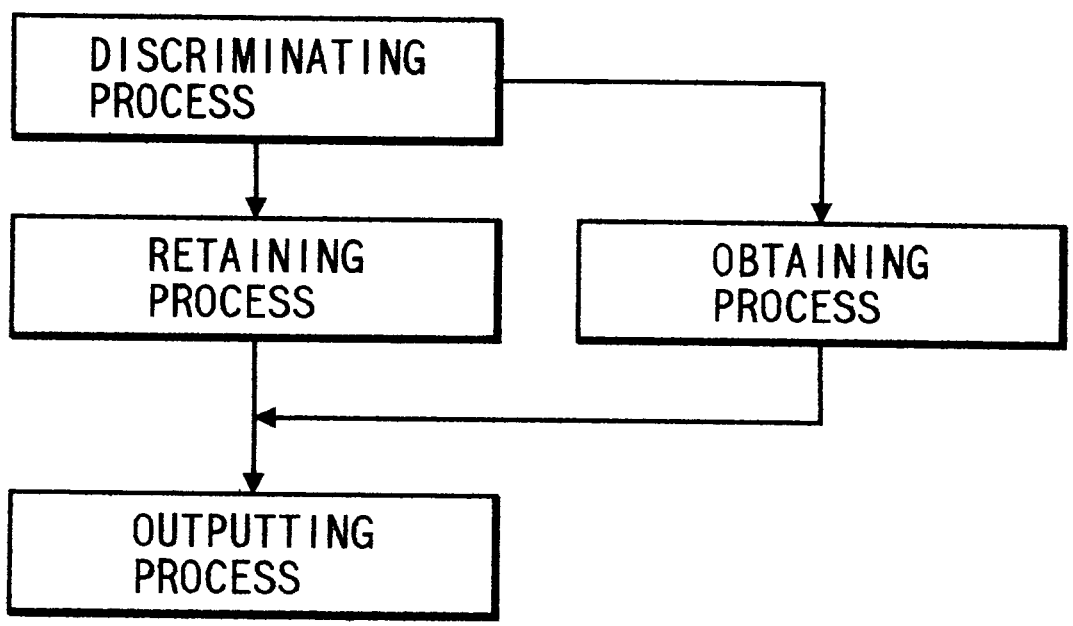
FIGS. 13A and 13B are views showing the configuration of a control program in the above-mentioned embodiment.
Figure 13B:
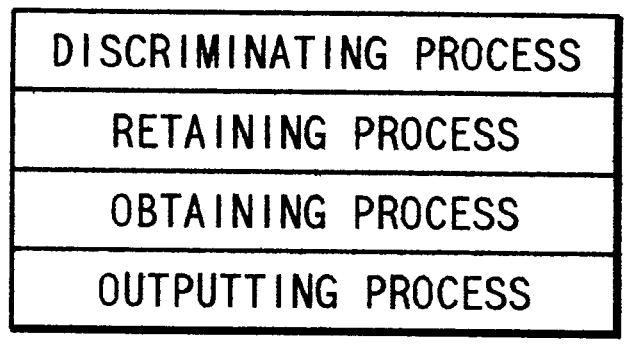

FIGS. 13A and 13B show the configuration of the control program of the present invention, wherein FIG. 13A shows the control sequence of the program. A discrimination process program consists of sequence codes for discriminating whether two points are simultaneously depressed on the touch panel 9, and realizes the process of the steps S11 to S14 in FIG. 5A.

Also a retaining process program consists of sequence codes for retaining, in case the above-mentioned discrimination process identifies that a point is depressed on the touch panel 9, the coordinate data representing the depressed position as latest coordinate data. The latest coordinate data are stored in a predetermined RAM area, secured by the control program. The control realized by the retaining process program corresponds to the steps S15 to S23 in FIGS. 5A and 5B.

An obtaining process program consists of sequence codes for obtaining, in case the above-mentioned discrimination process program identifies that two points are simultaneously depressed on the touch panel 9, the coordinate data based on the coordinate data retained by the above-mentioned retaining process program and the potentials in the x and y directions, obtained from the conductive films constituting the touch panel 9. This process is same as already explained with reference to the flow chart in FIG. 6.

An output process program consists of sequence codes for outputting the coordinate data retained by the retaining process and those obtained by the obtaining process, as the coordinate data of the simultaneously depressed two points, for example to another application program. This process corresponds to the step S29 in FIG. 5B.

This invention may be applied to a system consisting of plural equipment or an apparatus consisting of a single equipment. It is naturally applicable also to a case where the present invention is attained by the supply of a program to a system or to an apparatus. In such case, a memory medium storing a program relating to the present invention constitutes the present invention, and such system or apparatus functions in a predetermined manner, by loading the program from such memory medium to the system or the apparatus.

As explained in the foregoing, the present invention enables, in the coordinate detection based on the resistive film system or the like, to detect the coordinates of two points designated simultaneously.

Embodiment 4

Figure 14:
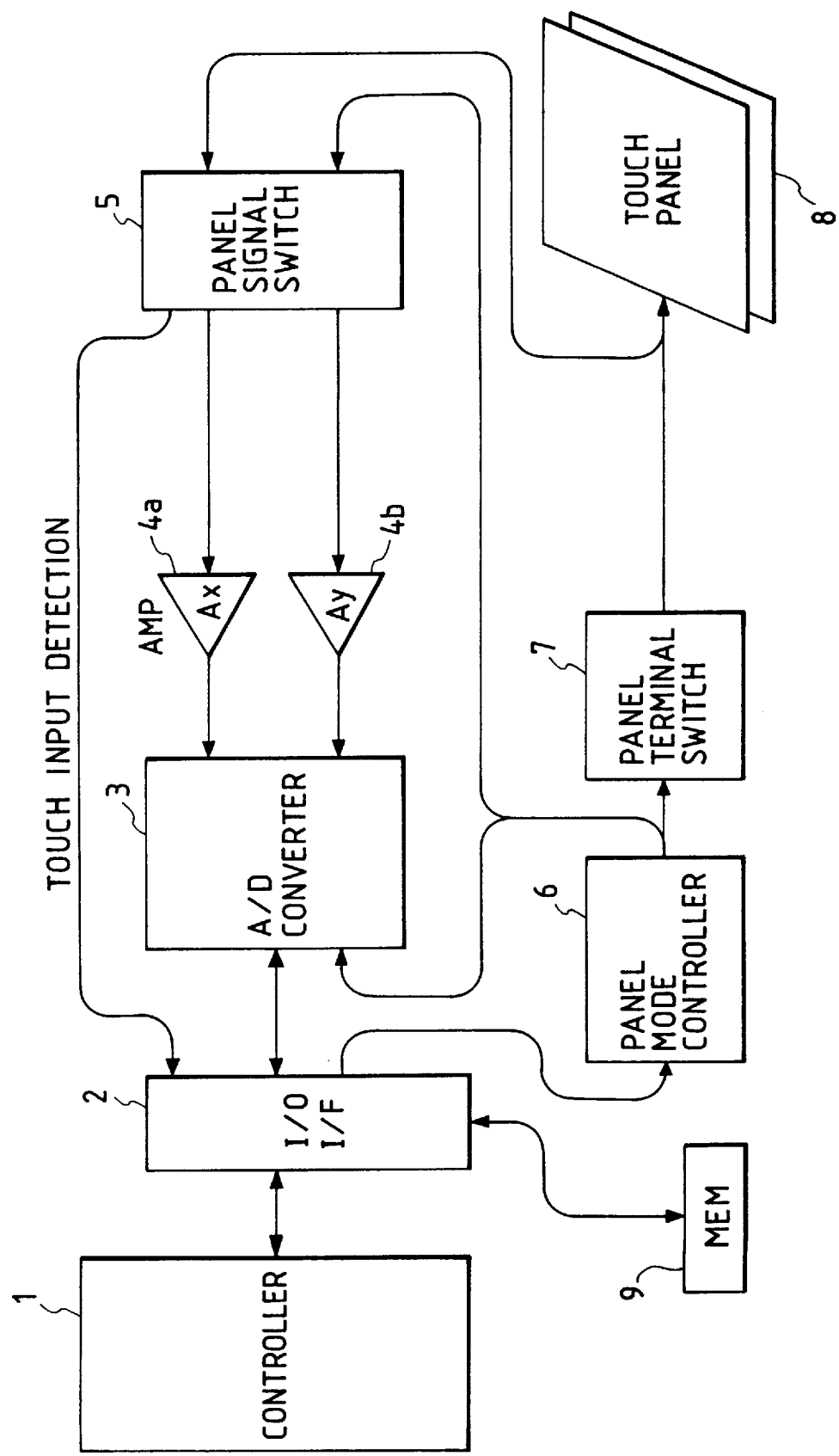
FIG. 14 is a schematic block diagram of a fourth embodiment.

FIG. 14 is a block diagram showing the configuration of a coordinate input device of a fourth embodiment.

The coordinate input device is composed of a control circuit 1 constituting operation control means for effecting various operation controls; an I/O interface 2; an A/D converter 3; amplifiers 4a, 4b; a panel signal switch 5; a panel mode controller 6; a panel terminal switch 7; a touch panel 8; and a memory 9 storing programs and calculation formulas.

Figure 15:
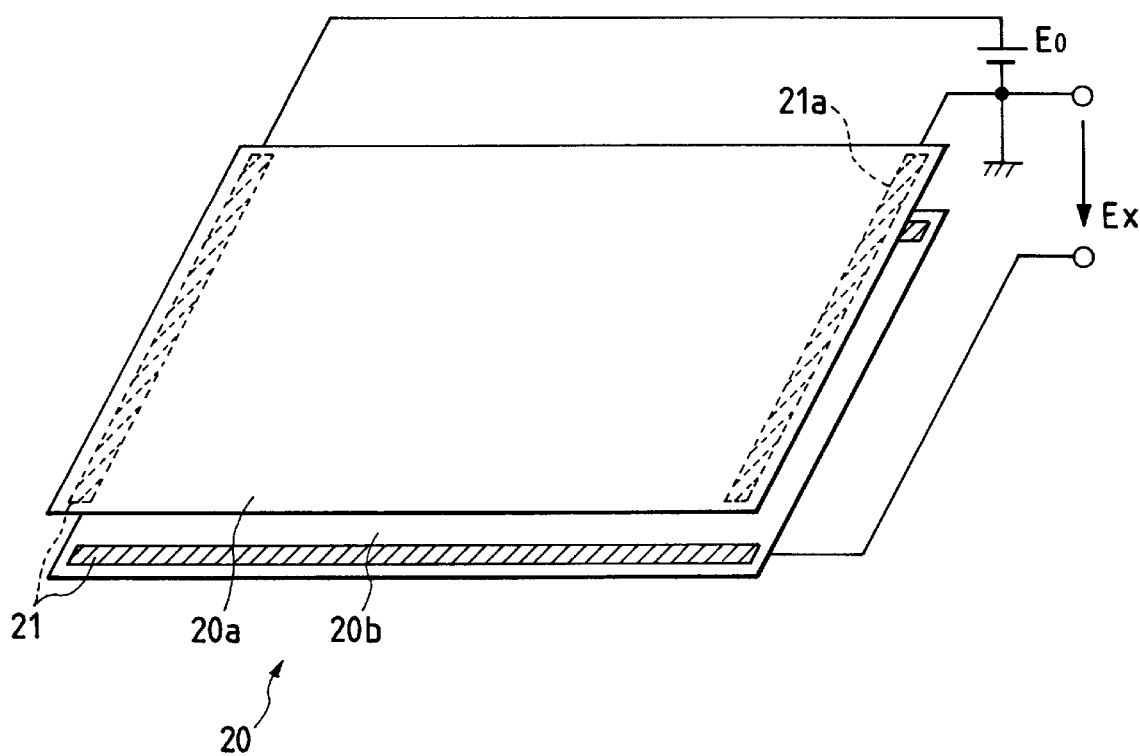
FIG. 15 is a schematic view of a touch panel 8.

The touch panel 8 is composed of two conductive films 20, serving as resistive layers and consisting of an x-axis film 20a (with electrodes arranged parallel to the y-axis) and a y-axis film 20b (with electrodes arranged parallel to the x-axis), as shown in FIG. 15.

The conductive films 20 have a uniform resistance distribution, and are provided with voltage-applying electrodes 21 and grounded electrodes 21a on both ends, in mutually perpendicular directions in the respective films.

The touch panel 8 is composed of the two conductive films 20 which are positioned with the conductive faces thereof in mutually facing relationship in such a manner that they are brought into contact only in a position depressed by a finger or a pen, wherein a change in the output potential, resulting from the change in the contact position, is detected to determine the coordinate. Thus a voltage is applied to one of the conductive films 20 and an output is obtained from the other film in opposed position. The output from the touch panel 8 is supplied, as a high-level signal, to the panel signal switch 5, and entered as a touch input detection signal to the control circuit 1 through the I/O interface 2.

FIG. 15 shows a state in which a voltage is applied in the lateral direction on the x-axis film 20a and an output is obtained from the opposed y-axis film 20b.

The panel terminal switch 7 is controlled by the panel mode controller 6 in such a manner that a current is generated when a depressing operation takes place on the touch panel 8.

The memory 9 stores calculation formulas for calculating the coordinate of the second point, in a two-point mode to be explained later.

The control circuit 1 has two input modes for the coordinate calculation, i.e., a one-point input mode for the entry of a point only, and a two-point input mode for the simultaneous entry of two points.

Also the control circuit 1 arbitrarily defines an area, required for the selection of the two modes, on the touch panel 8, and shifts t o the two-point input mode only in case a coordinate input is made in a predetermined area in the one-point input mode and executes the calculation in the two-point input mode until the absence of the touch input is identified next time.

Furthermore, the control circuit 1 is provided therein with a one-point coordinate memory serving as storage means, and the data retained in this one-point coordinate memory are not renewed at the two-point inputs but only in case of the one-point input.

Furthermore the control circuit 1 is provided with a touch input discrimination mode, for discriminating the presence or absence of the touch on the touch panel 8, and is adapted to control the panel mode controller 6 through the I/O interface 2 to control various units and to execute the coordinate detecting procedure in response to a touch input.

The coordinate detecting procedure is executed by the switching of the panel terminal switch 7 by the control circuit 1 through the panel mode controller 6, whereupon the output potential of the touch panel 8 is selected by the panel signal switch 5, then amplified by the amplifiers 4 and converted into digital data by the A/D converter 3. The above-mentioned coordinate detecting procedure is executed for each of x-axis and y-axis.

The converted digital data, obtained in this coordinate detecting procedure, are used for the coordinate calculation in the control circuit 1, according to different calculation formulas depending on the aforementioned one-point input mode or two-point input mode, as will be explained later with reference to flow charts.

Now the method of obtaining the output will be explained with reference to FIGS. 4 and 7.

Referring to FIG. 4, if only one point B is depressed, the output potential Ex is given by:

$$x1 = (Ex/E_0) \times Lx_0 \tag{1}$$

wherein $Lx_0$ is the lateral length of the panel, $E_0$ is the applied voltage, and x1 is the distance between the depressed position and the reference plane (i.e., shortest distance to the ground electrode 21a). In case of the one-point input, the lateral position or the x-coordinate can thus be directly detected from the equation (1). The y-coordinate can be detected in a similar manner, by switching the voltage applied to the panel in such a manner that the voltage is applied to the y-axis film 20b and the output potential is taken out from the x-axis film 20a. The voltage applied to the panel may be an AC or DC voltage, and the detection may also be made with the current division ratio, instead of the potential.

In the two-point input mode, the coordinate data of an immediately previously entered point are used because the coordinate input device of the present embodiment is anticipated to be used as a virtual keyboard. In the use as such keyboard, the operations of depressing two points (two keys) cannot take place strictly simultaneously. In such operation, it is customary to at first depress the "shift" key and to depress an alphabet key while the "shift" key is kept depressed, or to at first depress the "ctrl" key and then to depress another key while the "ctrl" key is kept depressed, and, also in consideration of the normal finger operation, it is natural to at first keep a key depressed and to depress another key. Consequently, in the detection of inputs at two points, an input point remains fixed and the other input point is detected as unknown input data. Stated differently, the present embodiment utilizes a fact that two points are not entered at the strictly same time.

Also even after shifting to the two-point coordinate calculation mode, the obtained output potential remains unchanged if the second point is not entered. In such case, there may be selected either to release two same coordinates or only one coordinate, according to the conditions of use.

In the following there will be explained the change in the output potential at the entry of the second point, in the configuration shown in FIG. 15. In case of two-point inputs, with simultaneous depressions at points A and B as shown in FIG. 4, the current therebetween flows in two paths along the upper and lower conductive films 20. If the contact resistance between the two films at the contact points becomes negligibly small by the sufficient depressing pressure, the resistance between the points A and B becomes about half, in comparison with the resistance in the undepressed state.

FIG. 7 shows the iso-potential lines on the film surface at the two-point inputs. In such state, as shown in FIG. 7, the iso-potential lines are no longer parallel straight lines. Between the two contact points, the iso-potential lines are spaced wider, as the resistance between the two points is lowered. As the resistance between the points A and B is approximately halved, the potential Ea at the point A is given by:

$$Ea=(\Delta x/2+x1)/(Lx_0-\Delta x/2)\times E_0 \qquad (2)$$

Similarly the potential Eb at the point B is given by:

$$Eb=x1/(Lx_0-\Delta x/2)\times E_0 \qquad (3)$$

Thus the output potentials of the x-axis film 20a and the y-axis film 20b are not proportional to the respective coordinates.

In the following there will be explained the method of calculating the coordinate of the second point from the output potentials. The output potentials of the x-axis film is affected not only by the x-coordinates of the two points but also by the y-coordinates of the two points. Stated otherwise, the output potential is also affected by the position on the opposed film for output obtaining. For this reason, the potentials at the points A and B do not directly constitute the output potentials. In FIG. 4, the positions of the signal obtaining electrodes are same as the positions on the x-axis film 20a because the illustration is simplified, but, in practice, the films are so positioned that the electrodes thereof are mutually perpendicular, as shown in FIG. 2. Thus, if the resistive layers of the two films have a substantially same resistance and if the pressure at the contact points is sufficiently high to sufficiently reduce the contact resistance, the potential Ex2 is given by the following form, as in a resistance bridge:

$$Ex2=(yb\times Ea+ya\times Eb)/(ya+yb) \qquad (4)$$

wherein ya or yb is the distance between the point A or B and the signal obtaining electrode (i.e., shortest distance to the electrode).

Similarly the output obtained by applying a voltage to the y-axis film 20b is given by:

$$Ey2=(x2\times E1+x1\times E2)/(x1+x2) \qquad (5)$$

wherein $$\Delta x=x2-x1$$

$$E1=(\Delta y/2+y1)/(Ly_0-\Delta y/2)\times E_0$$

$$E2=y1/(Ly_0-\Delta y/2)\times E_0$$

$$\Delta y=y2-y1$$

FIGS. 8A and 8B show the output potentials, respectively in the x-direction and y-direction, in the actual two-point inputs on the conductive films 20.

The known input point, or the latest input point in the one-point input operation, is represented by (x1, y1) while the newly depressed second point is represented by (x2, y2). FIGS. 8A and 8B show the outputs when the first point is at the center of the touch panel, wherein the value (x2, y2) and the output potential (in the vertical axis) are represented by normalized values. The coordinate of the center of the touch panel 8 is normalized to (0.5, 0.5).

As shown in FIGS. 8A and 8B, the output is uniquely determined for a given (x2, y2) value. Stated differently, a set of the output potentials in the x- and y-directions at the two-point inputs provides only one coordinate (x2, y2).

Consequently the coordinate data (x2, y2) of the other point can be determined from the output potentials, by substituting the coordinate data, loaded from the one-point coordinate memory, into the equations (4) and (5). Thus the coordinate input devices releases, for example to the host computer, the coordinate data (x2, y2) determined by the calculation and the coordinate data (x1, y1) used in the calculation.

Figure 16:
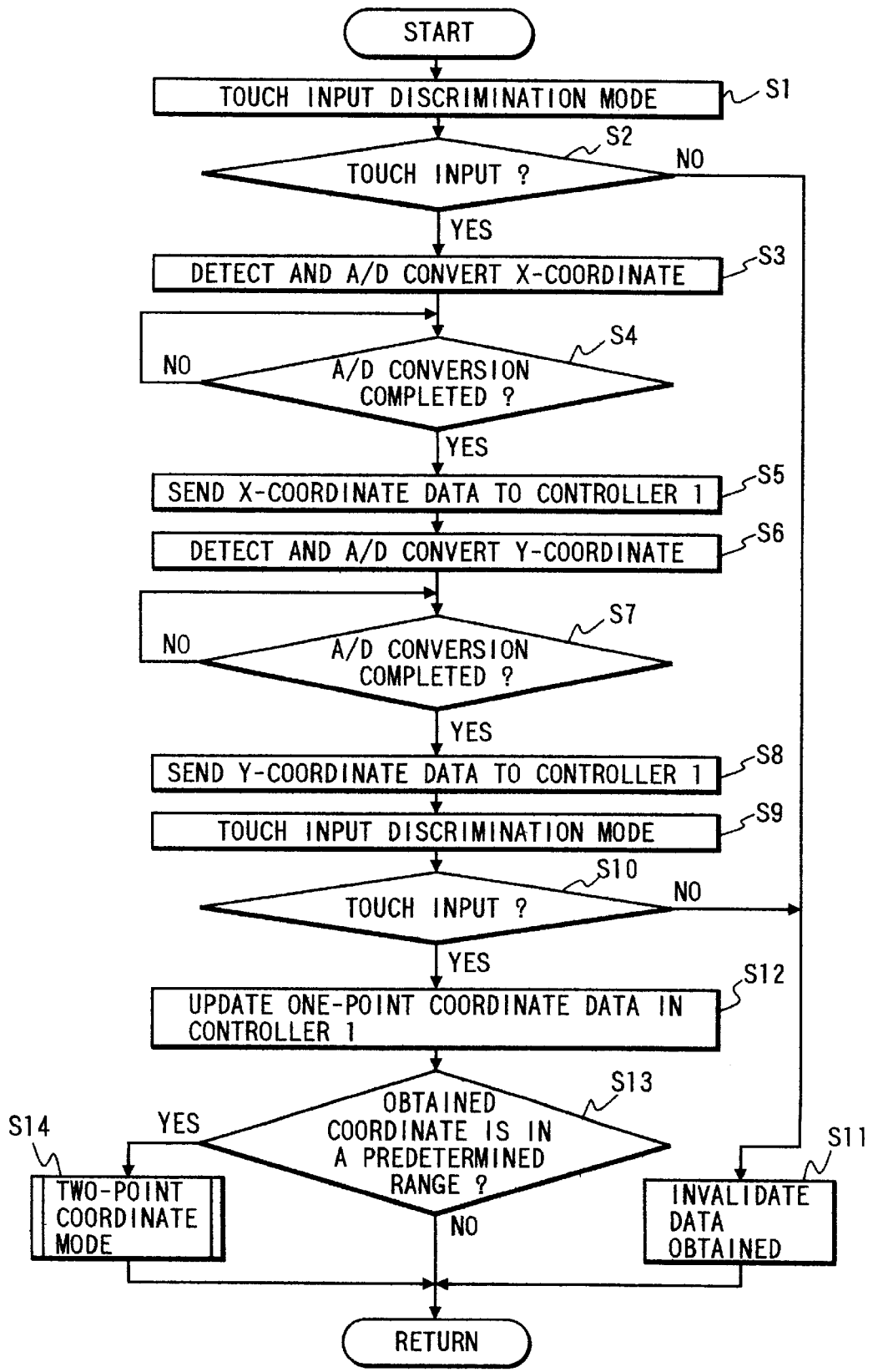
FIG. 16 is a flow chart showing the function of the fourth embodiment.
Figure 17:
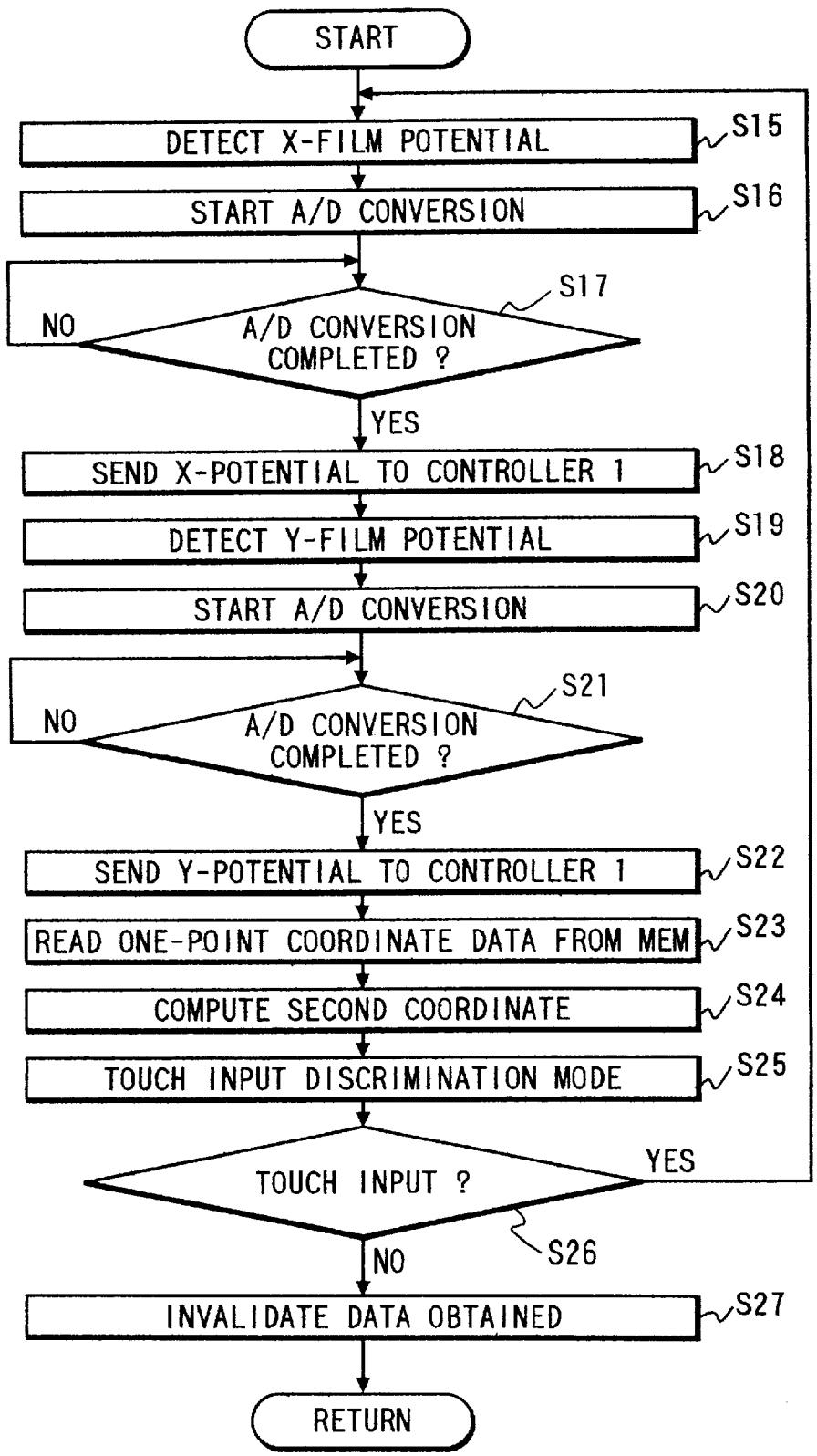
FIG. 17 is a flow chart showing the function in a two-point input coordinate calculation mode.

In the following the operation of the present embodiment of the above-explained configuration will be explained with reference to flow charts in FIGS. 16 and 17, with emphasis on the coordinate calculation by the control circuit 1. FIG. 16 shows the function in the one-point input mode, while FIG. 17 shows that in the two-point input mode, serving as a sub routine. In the following description, the operations are executed by the control circuit 1, unless specified otherwise.

At first, when a touch input is made on the touch panel 8 for example with a finger of the user, the control circuit 1 shifts the panel terminal switch 7 to shift to the touch input discrimination mode (S1), and to effect the touch input discrimination (S2). In the presence of a touch input, the control circuit 1 causes the panel mode controller 6 to shift the panel terminal switch 7 for calculating the x-coordinate, whereby the output potential of the touch panel 8 is amplified by the amplifier 4. Then the A/D converter 3 starts the A/D conversion of thus amplified output potential (S3).

Then the control circuit 1 discriminates whether the A/D conversion has been completed (S4), and, if not, continues the A/D conversion, but, if completed, the A/D converter 3 sends the converted data as the x-coordinate output to the control circuit 1 through the I/O interface 2 (S5).

When the output of the x-coordinate is completed, the control circuit 1 initiates the A/D conversion for the y-coordinate calculation (S6). Then it discriminates whether the A/D conversion has been completed (S7), and, if not, the A/D conversion is continued, but, if completed, the converted data are supplied as y-coordinate output to the control circuit 1 through the I/O interface 2 (S8).

Then the control circuit 1 again discriminates, in the touch input discrimination mode (S9), whether the touch input has been terminated in the course of the coordinate detecting procedure (S10). If the touch input is no longer present (namely if the touch input has been terminated in the course of the coordinate detecting procedure), the obtained data are considered unreliable and discarded (S11).

If the touch input has not been terminated, the obtained coordinate is supplied to the one-point coordinate memory of the control circuit 1 to renew the stored value therein (S12). Then there is discriminated whether the coordinate obtained by calculation is within a predetermined area (S13), and, if within such area, the sequence jumps to the two-point coordinate calculation mode in a sub routine shown in FIG. 17 (S14). If not within the area, a cycle of the one-point input mode is completed.

In case the two-point inputs are identified by the presence of the coordinate within the predetermined area, the sequence jumps to the sub routine of the two-point coordinate calculation mode shown in FIG. 17.

At first, when the potential of the x-axis film is detected (S15), the A/D converter 3 starts the A/D conversion (S16).

Then there is discriminated whether the A/D conversion has been completed (S17), and, if not, the A/D conversion is continued, but, if completed, the converted data are supplied to the control circuit 1 through the I/O interface 2 (S18).

When the output of the x-coordinate is completed, the potential of the y-axis film is detected (S19), and the A/D conversion for calculating the y-coordinate is started (S20). Then there is discriminated whether the A/D conversion has been completed (S21), and, if not, the A/D conversion is continued, but, if completed, the converted data are supplied to the control circuit 1 through the I/O interface 2 (S22). Subsequently the immediately previously sampled coordinate data of a one-point input are loaded from the one-point coordinate memory (S23). The control circuit 1 calculates the coordinate of the second point, utilizing the above-mentioned data as one of the data used in the two-point inputs (S24). When the calculation is completed, the presence of the touch input is discriminated as in the one-point input mode (S25), and, in the presence of a touch input, the sequence of FIG. 17 is repeated until the touch input is terminated.

On the other hand, if the touch input is no longer present (if the touch input has been terminated in the course of execution), the obtained data are considered unreliable and discarded (S27). Thus the sub routine of the two-point coordinate calculation is terminated.

As explained in the foregoing, the present embodiment provides a coordinate input device enabling entry of two points with a simple configuration and with a touch panel same as in the prior art, as the coordinate data (x and y coordinates) of the second point in the two-point inputs can be determined by calculation based on the output potential data of the two conductive films 20.

As the coordinate input device of the present embodiment enables input of two points with a simple configuration, particularly without any change in the touch panel, there can be realized a virtual keyboard enabling the input operations same as those in the ordinary keyboard, when the present device is applied to an information processing apparatus utilizing a virtual keyboard.

Embodiment 5

In the following there will be explained a fifth embodiment of the present invention, which is identical with the foregoing fourth embodiment except for the panel terminal switch 7 and the control circuit 1.

The panel terminal switch 7 is so constructed, easily with an electronic switch such as of FET, that the switching operation varies according to the value in the one-point coordinate memory.

The control circuit 1 is so constructed as to effect a coordinate conversion process after the coordinate calculation process, since the original point of the coordinate, obtained in the calculation, varies by the switching operation of the panel terminal switch 7.

In the following there will be explained the manner of switching of the panel terminal switch 7 according to the value in the one-point coordinate memory.

FIGS. 9A and 9B show the output potential in case the coordinate data (x1, y1) are (0.1, 0.1) (in normalized values), respectively in the x- and y-directions.

These output potentials are not much different from the case shown in FIGS. 8A and 8B, and such limited change in the output potentials gives rise to a lowered resolving power in the calculation of the coordinate data (x2, y2). Such loss in the resolving power is not critical if the virtual keyboard extends over the entire area of the touch panel, but becomes a problem if the touch panel becomes larger and the virtual keyboard is formed in a part thereof.

Also FIGS. 10A and 10B show the output potentials of the x- and y-axis films in case the coordinate data (x1, y1) are (0.9, 0.9), respectively in the x- and y-directions. These charts indicates that a larger output range, or a higher resolving power, can be obtained in comparison with the case (x1, y1)=(0.1, 0.1).

It is to be noted, however, that the coordinate value on the chart varies according to the direction of the applied voltage $E_0$. More specifically, by inverting the direction of $E_0$, x1=0.1 becomes x1=0.9. Therefore, if the coordinate (x1, y1) has a value deteriorating the resolving power in the calculation of (x2, y2), such as (x1, y1)=(0.1, 0.1), the panel terminal switch 7 can be shifted to obtain a sufficient output range.

Thus the above-explained configuration enables two-point inputs with a sufficient resolving power, by shifting the panel terminal switch 7 to invert the direction of the applied voltage according to the value of the one-point coordinate memory.

Embodiment 6

Figure 18:
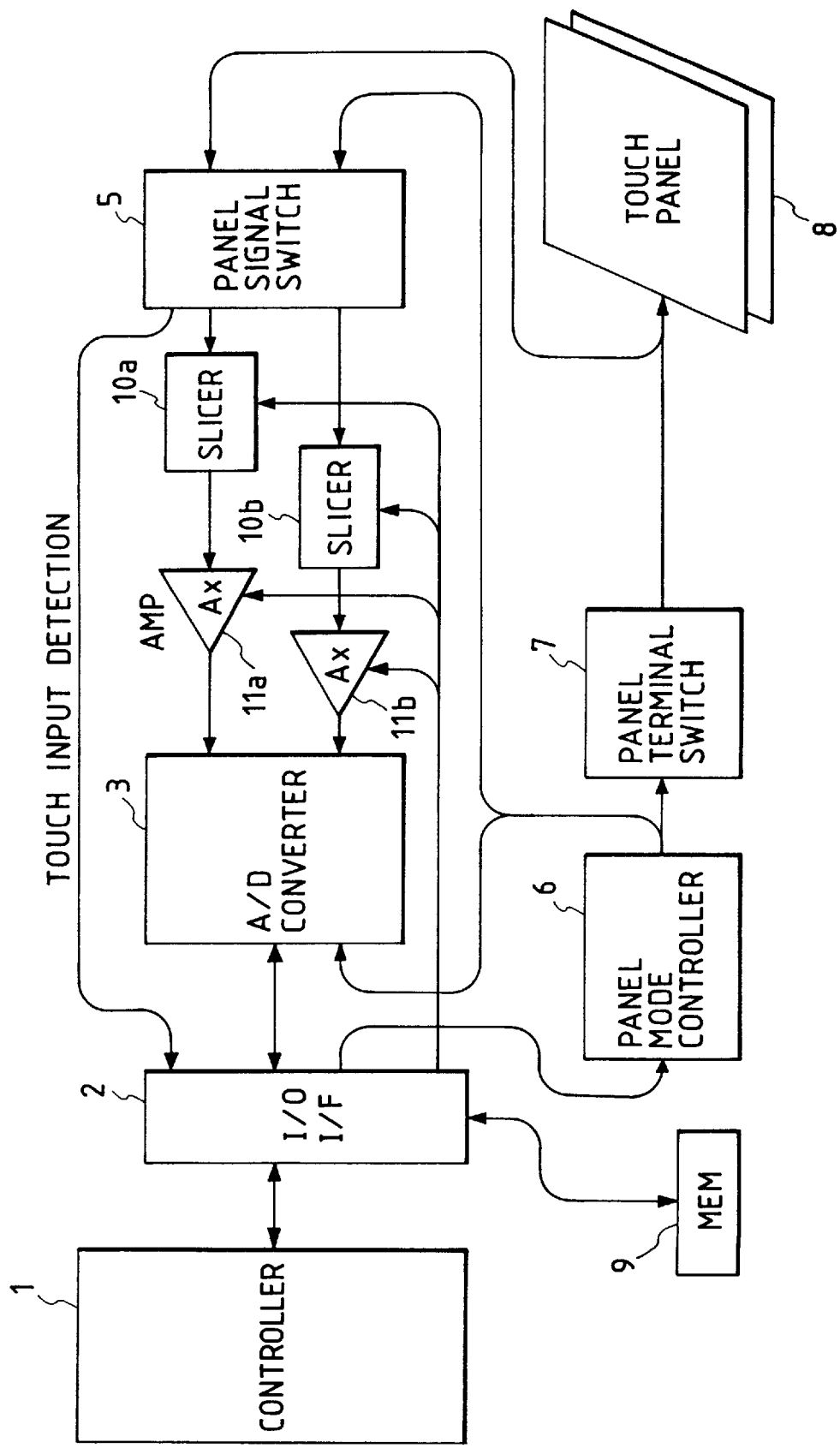
FIG. 18 is a schematic block diagram of a sixth embodiment.

In the following there will be explained a sixth embodiment of the present invention, of which block diagram is shown in FIG. 18.

The device of the present embodiment is provided, in addition to the configuration of the foregoing fourth embodiment, with slicing circuits 10a, 10b for eliminating a DC component not reaching the minimum output level of the touch panel 8, and variable-gain amplifiers 11a, 11b instead of the amplifiers 4a, 4b.

The device of the present embodiment employs, for improving the resolving power of the output potential, a method of optimizing the detection range, instead of the method of inverting the applied voltage in the foregoing fifth embodiment.

An output range as shown in FIG. 16 can be anticipated from the value of the one-point coordinate memory. Consequently the employed method utilizes a fact that the resolving power of detection can be maximized by matching such output range with the input range of the A/D conversion. This is achieved by eliminating the DC component less than the minimum output level by means of the slicing circuits 10a, 10b, and by processing the output of the touch panel 8 with a maximum gain not causing saturation at the maximum output level, by means of the variable-gain amplifiers 11a, 11b.

In this manner there can be realized a coordinate input device with an improved resolving power of calculation.

Also as the processing of the output of the touch panel is modified according to the position of input, the coordinate input with a sufficiently high resolving power can be realized even if the virtual keyboard is reduced in size, in the application of the present device to an information processing apparatus employing a virtual keyboard.

As detailedly explained in the foregoing, the present invention provides the following effects.

As the coordinate of the second point is determined from the output potentials of the resistive films, based on the coordinate of the first point, there can be realized a coordinate input device enabling simultaneous inputs of two points with a simple structure, without any addition of complex components. Thus there can be provided a coordinate input device, capable of forming a virtual keyboard which is equivalent in the input operations to the actual keyboard.

Also the resolving power in the calculation of the coordinate of the second point can be improved, in case simultaneous inputs of two points are identified by the discrimination means, by inverting the direction of the voltage applied to the resistive film, according to the coordinate stored in the storage means.

Also there can be provided a coordinate input device with a sufficiently high resolving power of calculation, by determining the coordinate of the second point through the output potential process means in case of the simultaneous two-point input state.

What is claimed is:

1. A coordinate detecting device provided with a panel composed of two conductive films, comprising:

discrimination means for discriminating whether two points are simultaneously depressed on said panel;

retaining means adapted, in case said discrimination means identifies that a point is depressed on said panel, to retain a coordinate of the depressed point as latest coordinate data;

obtaining means adapted, in case said discrimination means identifies that two points are simultaneously depressed on said panel, to obtain coordinate data based on the coordinate data retained by said retaining means and potentials in x and y directions obtained from said conductive films; and output means for outputting the coordinate data retained by said retaining means and the coordinate data obtained by said obtaining means as the coordinate data of the simultaneously depressed two points, wherein said obtaining means includes:
switch means for switching a direction of application of a voltage to said conductive films, based on the coordinate data retained in said retaining means;
calculation means for calculating the coordinate data based on the coordinate data retained in said retaining means and the potentials in the x and y directions obtained from said conductive films; and
conversion means for converting the coordinate data, calculated by said calculation means, based on the direction of application of the voltage controlled by said switch means.

2. A coordinate detecting device according to claim 1, wherein said discrimination means is adapted to discriminate whether two points are simultaneously depressed on said panel, based on a decrease in resistance of at least either of said two conductive films.

3. A coordinate detecting device according to claim 1, further comprising:

varying means adapted, in case said discrimination means identifies that two points are simultaneously depressed on said panel, to vary an amplification range for the potentials in the x and y directions, obtained from said conductive films.

4. A coordinate detecting device according to claim 3, wherein said varying means includes slicing means for eliminating an unnecessary output potential level based on ranges of the potentials in the x and y directions, obtained from said conductive films.

5. A coordinate detecting method utilizing a panel composed of two conductive films, comprising:

a discrimination step for discriminating whether two points are simultaneously depressed on said panel;

a retaining step adapted, in case said discrimination step identifies that a point is depressed on said panel, to retain a coordinate of the depressed point as latest coordinate data;

an obtaining step adapted, in case said discrimination step identifies that two points are simultaneously depressed on said panel, to obtain coordinate data based on the coordinate data retained by said retaining step and potentials in x and y directions obtained from said conductive films; and an output step for outputting the coordinate data retained by said retaining step and the coordinate data obtained by said obtaining step as the coordinate data of the simultaneously depressed two points, wherein said obtaining step includes:
a switch step for switching a direction of application of a voltage to said conductive films, based on the coordinate data retained in said retaining step;
a calculation step for calculating the coordinate data based on the coordinate data retained in said retaining step and the potentials in the x and y directions obtained from said conductive films; and
a conversion step for converting the coordinate data, calculated by said calculation step, based on the direction of application of the voltage controlled by said switch step.

6. A coordinate detecting method according to claim 5, wherein said discrimination step is adapted to discriminate whether two points are simultaneously depressed on said panel, based on a decrease in resistance of at least either of said two conductive films.

7. A coordinate detecting method according to claim 5, further comprising:

a varying step adapted, in case said discrimination step identifies that two points are simultaneously depressed on said panel, to vary an amplification range for the potentials in the x and y directions, obtained from said conductive films.

8. A coordinate detecting device according to claim 7, wherein said varying step includes a slicing step for eliminating an unnecessary output potential level based on the ranges of the potentials in the x and y directions, obtained from said conductive films.

9. A computer controlling device for controlling a computer by reading a predetermined program from a memory medium, wherein said memory medium includes:

a process code of a discrimination step for discriminating whether two points are simultaneously depressed on a panel composed of two conductive films;

a process code of a retaining step adapted, in case said discrimination step identifies that a point is depressed on said panel, to retain a coordinate of the depressed point as latest coordinate data;

a process code of an obtaining step adapted, in case said discrimination step identifies that two points are simultaneously depressed on said panel, to obtain coordinate data based on the coordinate data retained by said retaining step and potentials in x and y directions obtained from said conductive films; and a process code of an output step for outputting the coordinate data retained by said retaining step and the coordinate data obtained by said obtaining step as the coordinate data of the simultaneously depressed two points, wherein the process code of the obtaining step includes:
a process code of a switch step for switching a direction of application of a voltage to said conductive films, based on the coordinate data retained in the retaining step;
a process code of a calculation step for calculating the coordinate data based on the coordinate data retained in the retaining step and the potentials in the x and y directions obtained from said conductive films; and
a process code of a conversion step for converting the coordinate data, calculated by the calculation step, based on the direction of application of the voltage controlled by the switch step.

10. A coordinate detecting device provided with a panel having detecting means comprising a plurality of members that are electrically contactable with each other, comprising:

discrimination means for discriminating whether two points are simultaneously depressed on the panel;

retaining means adapted, in case the discrimination means identifies that a point is depressed on the panel, to retain a coordinate of the depressed point as latest coordinate data;

obtaining means adapted, in case the discrimination means identifies that two points are simultaneously depressed on the panel, to obtain coordinate data based on the coordinate data retained by the retaining means and potentials in x and y directions obtained from the plurality of electrically contactable members of said detecting means; and output means for outputting the coordinate data retained by the retaining means and the coordinate data obtained by the obtaining means as the coordinate data of the simultaneously depressed two points.

11. A coordinate detecting method utilizing a panel having detecting means comprising a plurality of members that are electrically contactable with each other, comprising:

a discrimination step for discriminating whether two points are simultaneously depressed on the panel;

a retaining step adapted, in case the discrimination step identifies that a point is depressed on the panel, to retain a coordinate of the depressed point as latest coordinate data;

an obtaining step adapted, in case the discrimination step identifies that two points are simultaneously depressed on the panel, to obtain coordinate data based on the coordinate data retained by the retaining step and potentials in x and y directions obtained from the plurality of electrically contactable members of said detecting means; and an output step for outputting the coordinate data retained by the retaining step and the coordinate data obtained by the obtaining step as the coordinate data of the simultaneously depressed two points.

12. A computer controlling device for controlling a computer by reading a predetermined program from a memory medium, wherein said memory medium includes:

a process code of a discrimination step for discriminating whether two points are simultaneously depressed on a panel having detecting means comprising a plurality of members that are electrically contactable with each other;

a process code of a retaining step adapted, in case the discrimination step identifies that a point is depressed on the panel, to retain a coordinate of the depressed point as latest coordinate data;

a process code of an obtaining step adapted, in case the discrimination step identifies that two points are simultaneously depressed on the panel, to obtain coordinate data based on the coordinate data retained by the retaining step and potentials in x and y directions obtained from the plurality of electrically contactable members of said detecting means; and a process code of an output step for outputting the coordinate data retained by the retaining step and the coordinate data obtained by the obtaining step as the coordinate data of the simultaneously depressed two points.

* * * * *

UNITED STATES PATENT AND TRADEMARK OFFICE
CERTIFICATE OF CORRECTION

PATENT NO.    : 6,255,604 B1
DATED         : July 3, 2001
INVENTOR(S)   : Masaki Tokioka et al.

It is certified that error appears in the above-identified patent and that said Letters Patent is hereby corrected as shown below:

Column 2,
Line 6, "(4)," should read -- (4) --.
Line 7, "do" should read -- does --.

Column 4,
Line 55, "case" should read -- a case --.

Column 5,
Line 7, "case" should read -- the case --.
Line 35, "same" should read -- the same --.
Line 50, "such" should read -- such as --.

Column 6,
Line 21, "In case" should read -- In the case of --.
Line 59, "tough" should read -- touch --.

Column 7,
Line 31, "same" should read -- the same --.
Line 67, "key" should read -- key. The --.

Column 8,
Line 1, "¶Consequently," should read -- Consequently --.
Line 5, "the strictly" should read -- strictly the --.
Line 29, "same" should read -- the same --.
Line 55, "Ay=y2-y1" should read -- $\Delta y = y2 - y1$ --.

Column 9,
Line 34, "same" should read -- the same --.
Line 65, "is" should read -- are --.

Column 11,
Line 29, "same" should read -- the same --.

Column 12,
Line 30, "t o" should read -- to --.

UNITED STATES PATENT AND TRADEMARK OFFICE
CERTIFICATE OF CORRECTION

PATENT NO. : 6,255,604 B1
DATED : July 3, 2001
INVENTOR(S) : Masaki Tokioka et al.

It is certified that error appears in the above-identified patent and that said Letters Patent is hereby corrected as shown below:

Column 13,
Line 2, "case" should read -- the case --.
Line 28, "the strictly" should read -- strictly the --.
Line 36, "case" should read -- the case --.
Line 64, "is" should read -- are --.

Column 14,
Line 4, "same" should read -- the same --.
Line 51, "devices" should read -- device --.

Column 16,
Line 2, "same" should read -- the same --.
Line 10, "same" should read -- the same --.
Line 44, "indicates" should read -- indicate --.
Line 62, "block" should read -- a block --.

Column 17,
Line 47, "case" should read -- the case --.

Signed and Sealed this

Twenty-eighth Day of May, 2002

JAMES E. ROGAN
*Director of the United States Patent and Trademark Office*

*Attest:*

*Attesting Officer*